United States Patent
Ogawa

(10) Patent No.: US 9,945,441 B2
(45) Date of Patent: Apr. 17, 2018

(54) CYLINDER DEVICE

(71) Applicant: KYB Corporation, Tokyo (JP)

(72) Inventor: Takayuki Ogawa, Kanagawa (JP)

(73) Assignee: KYB Corporation, Tokyo (JP)

( * ) Notice: Subject to any disclaimer, the term of this patent is extended or adjusted under 35 U.S.C. 154(b) by 105 days.

(21) Appl. No.: 15/124,866

(22) PCT Filed: Oct. 8, 2015

(86) PCT No.: PCT/JP2015/078668
§ 371 (c)(1),
(2) Date: Sep. 9, 2016

(87) PCT Pub. No.: WO2016/060066
PCT Pub. Date: Apr. 21, 2016

(65) Prior Publication Data
US 2017/0023086 A1  Jan. 26, 2017

(30) Foreign Application Priority Data
Oct. 17, 2014  (JP) .................................. 2014-212398

(51) Int. Cl.
*F16F 9/19*  (2006.01)
*B61F 5/24*  (2006.01)
(Continued)

(52) U.S. Cl.
CPC .................. *F16F 9/19* (2013.01); *B61F 5/24* (2013.01); *F15B 11/00* (2013.01); *F15B 11/10* (2013.01);
(Continued)

(58) Field of Classification Search
CPC ........ F16F 9/19; F16F 9/20; F16F 9/49; F16F 9/50; F16F 9/58; F16F 2222/12;
(Continued)

(56) References Cited

U.S. PATENT DOCUMENTS 2,954,755 A * 10/1960 Pecchenino ........... F15B 11/121
91/357
2014/0001690 A1  1/2014 Shii et al.
(Continued)

FOREIGN PATENT DOCUMENTS

CN  103443501 A  12/2013
JP  2000-238637 A  9/2000
(Continued)

*Primary Examiner* — Melanie Torres Williams
(74) *Attorney, Agent, or Firm* — Rabin & Berdo, P.C.

(57) ABSTRACT

A cylinder device includes a recess provided on either one of the piston and the cylinder, the recess facing the other one of the piston and the cylinder; an extension-side discharge passage configured to permit only a flow of liquid from the extension-side chamber toward the recess; a compression-side discharge passage configured to permit only a flow of liquid from the compression-side chamber toward the recess; a tank-side discharge passage configured to allow the extension-side discharge passage and the compression-side discharge passage to communicate with the tank through the recess; an extension-side damping force generation passage configured to apply a resistance to a flow of liquid passing therethrough so as to exert a damping force during extension; and a compression-side damping force generation passage configured to apply a resistance to a flow of liquid passing therethrough so as to exert a damping force during contraction.

12 Claims, 8 Drawing Sheets

(51) Int. Cl.
    *F16F 9/49*     (2006.01)
    *F16F 9/58*     (2006.01)
    *F15B 11/00*     (2006.01)
    *F15B 11/10*     (2006.01)
    *F16F 9/20*     (2006.01)
    *F16F 9/50*     (2006.01)

(52) U.S. Cl.
    CPC ............... *F16F 9/20* (2013.01); *F16F 9/49* (2013.01); *F16F 9/50* (2013.01); *F16F 9/58* (2013.01); *F16F 2222/12* (2013.01); *F16F 2228/066* (2013.01); *F16F 2230/22* (2013.01)

(58) Field of Classification Search
    CPC . F16F 2228/066; F16F 2230/022; B61F 5/24; F16B 11/10
    See application file for complete search history.

(56) References Cited

U.S. PATENT DOCUMENTS

2014/0196628 A1    7/2014    Ogawa et al.
2015/0354606 A1\*  12/2015  Ogawa .................... F15B 11/10
    60/469
2015/0369263 A1\*  12/2015  Ogawa .................... F15B 11/10
    60/459

FOREIGN PATENT DOCUMENTS

JP        2013-001305 A    1/2013
JP        5552174 B1 \*    7/2014  ............. F15B 11/10

\* cited by examiner

CYLINDER DEVICE

TECHNICAL FIELD

The present invention relates to a cylinder device.

BACKGROUND ART

Conventionally, as this type of cylinder device, for example, a cylinder device that is used by being interposed between a vehicle body and a carriage of a railway vehicle for suppressing oscillation in the left-right direction relative to the traveling direction of the vehicle body is known.

Such a cylinder device is configured to include, for example, a cylinder; a piston that is slidably inserted into the cylinder; a rod that is inserted into the cylinder and connected to the piston; a rod-side chamber and a piston-side chamber that are partitioned by the piston within the cylinder; a tank; a first opening and closing valve that is provided in a first passage and allows the rod-side chamber to communicate with the piston-side chamber; a second opening and closing valve that is provided in a second passage and allows the piston-side chamber to communicate with the tank; a pump that supplies a liquid to the rod-side chamber; a motor that drives the pump; a discharge passage that connects the rod-side chamber to the tank; and a variable relief valve provided in the discharge passage (for example, refer to JP 2013-1305A).

According to this cylinder device, the first opening and closing valve and the second opening and closing valve are appropriately opened and closed to determine a direction of a thrust to be output, and the pump is rotated by the motor at a constant speed to supply a fixed flow amount to the inside of the cylinder while adjusting the relief pressure of the variable relief valve, thereby controlling the pressure within the cylinder. Thus, a thrust of a desired magnitude can be output in a desired direction.

Further, another cylinder device is configured to include, for example, a cylinder; a piston that is slidably inserted into the cylinder; a rod that is inserted into the cylinder and connected to the piston; a rod-side chamber and a piston-side chamber that are partitioned by the piston within the cylinder; a tank; a first opening and closing valve that is provided in a first passage and allows the rod-side chamber to communicate with the piston-side chamber; a second opening and closing valve that is provided in a second passage and allows the piston-side chamber to communicate with the tank; a discharge passage that connects the rod-side chamber to the tank; and a variable relief valve provided in the discharge passage (for example, refer to JP 2000-238637A).

According to this cylinder device, the first opening and closing valve and the second opening and closing valve are appropriately opened and closed to determine a direction of a damping force to be output, and the relief pressure of the variable relief valve is adjusted to control the pressure within the cylinder. Thus, a damping force of a desired magnitude can be output.

On the other hand, in a railway vehicle in which such a cylinder device is utilized, when the vehicle body moves in the left-right direction relative to the carriage, if the movement of the vehicle body is permitted without restriction, the railway vehicle may contact oncoming vehicle, or the railway vehicle may contact a tunnel inner wall while traveling through a tunnel. Therefore, movement limits in the left-right direction of the vehicle body are established.

Specifically, a center pin is provided on the bottom of the vehicle body, and on the carriage side, a pair of stoppers are provided at spaced apart positions on the left and right sides of the center pin. When the vehicle body moves in the left-right direction relative to the carriage, the center pin will collide with the stoppers if the movement limit is reached, and thus the movement of the vehicle body relative to the carriage is restricted.

SUMMARY OF INVENTION

Considering a case in which oscillation in the horizontal direction of the vehicle body of a railway vehicle is suppressed with a conventional cylinder device, if acceleration in the horizontal direction of the vehicle body is detected with an acceleration sensor and a thrust or damping force which counteracts the detected acceleration is output by the cylinder device, oscillation of the vehicle body can be suppressed.

However, in a vehicle on existing railway lines, there are many opportunities for the center pin to collide with the stoppers due to cant deficiency when traveling over a curved section, and the acceleration at the time of collision is fed back. Therefore, the force output by the cylinder device becomes excessive and the vehicle is moved significantly relative to the carriage. Thus, there are cases in which the center pin frequently hits the stoppers, and this can negatively impact the riding comfort in the vehicle.

In order to control the cylinder device so as to restrict the movement amount of the vehicle body relative to the carriage, the displacement of the vehicle body relative to the carriage can be fed back and the cylinder device can be controlled to reduce the displacement. However, in this case, it is necessary to provide a stroke sensor in the cylinder device, and this may increase the size or length of the cylinder device. Further, since an electromagnetic valve is used for the variable relief valve, if a stroke sensor is provided to the cylinder device, noise from the electromagnetic valve may be superposed on the sensor signal, and thus control with good precision can no longer be expected. Moreover, if displacement control is executed, the rigidity between the vehicle body and the carriage increases when the cylinder device attempts to maintain the vehicle body near the center relative to the carriage. Therefore, a new problem arises in that the cylinder device functions like a rigid bar, and the object of achieving good riding comfort in terms of isolating the oscillation of the vehicle body can no longer be achieved.

The present invention has an object to provide a cylinder device which can improve the riding comfort in a railway vehicle.

According to one aspect of the present invention, a cylinder device includes a cylinder; a piston slidably inserted into the cylinder; a rod inserted into the cylinder and connected to the piston; an extension-side chamber and a compression-side chamber partitioned by the piston within the cylinder; a tank; an extension-side suction passage configured to permit only the passage of liquid from the tank toward the extension-side chamber; a compression-side suction passage configured to permit only the passage of liquid from the tank toward the compression-side chamber; a recess provided on either one of the piston and the cylinder, the recess facing the other one of the piston and the cylinder; an extension-side discharge passage provided in the piston and configured to permit only a flow of liquid from the extension-side chamber toward the recess; a compression-side discharge passage provided in the piston and configured to permit only a flow of liquid from the compression-side chamber toward the recess; a tank-side discharge passage configured to allow the extension-side discharge passage and the compression-side discharge passage to communicate with the tank through the recess; an extension-side damping force generation passage configured to apply a resistance to a flow of liquid passing therethrough so as to exert a damping force during extension; and a compression-side damping force generation passage configured to apply a resistance to a flow of liquid passing therethrough so as to exert a damping force during contraction.

DESCRIPTION OF EMBODIMENTS

Figure 1:
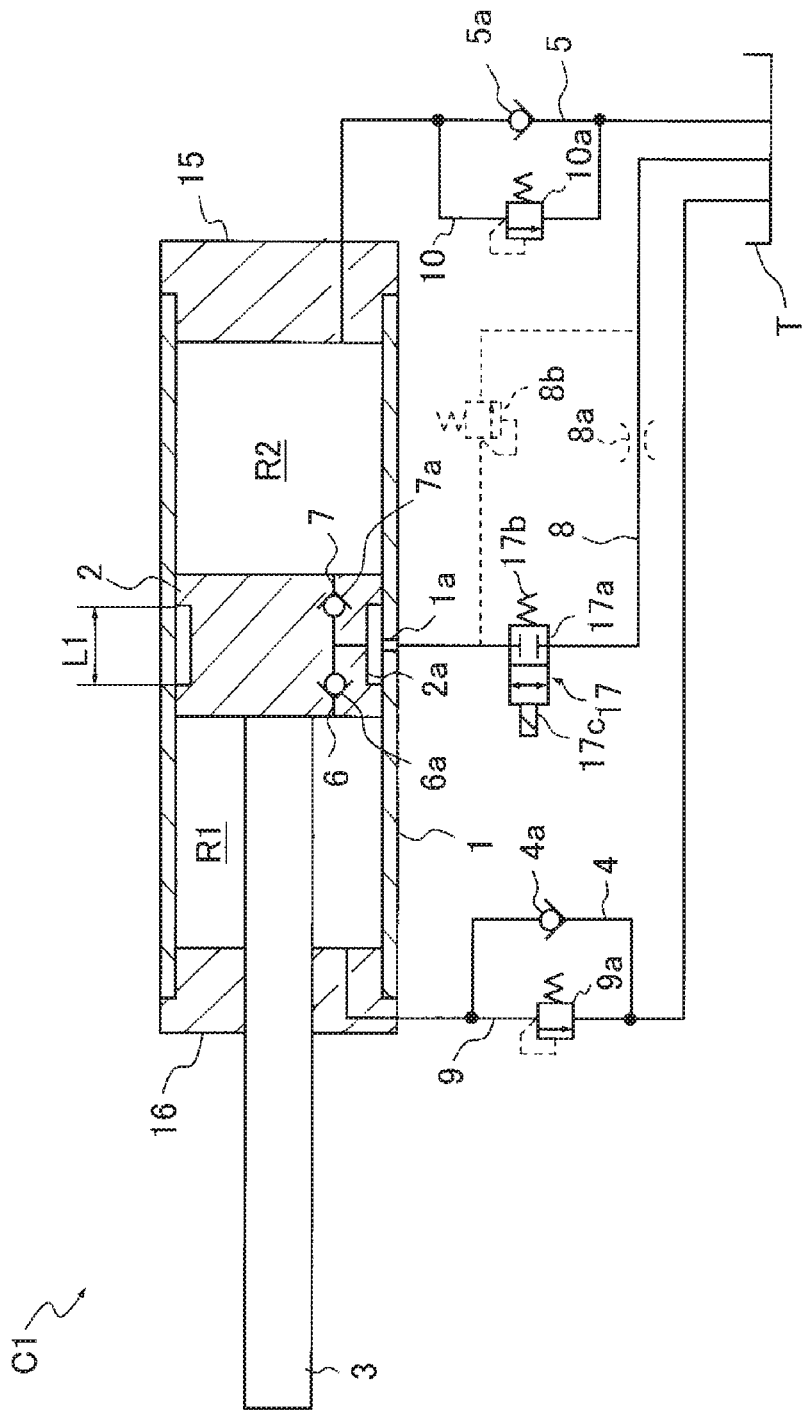
FIG. 1 is a schematic view of a cylinder device according to a first embodiment.

Embodiments of the present invention will now be explained below with reference to the attached drawings. In the embodiments, members which are common will be assigned the same reference numerals. In order to avoid redundant explanations, when members are common to the cylinder device of one embodiment and the cylinder device of another embodiment, detailed explanations of those members which were explained regarding the cylinder device of the one embodiment will be omitted from the explanations regarding the cylinder device of the other embodiment.

First Embodiment

As shown in FIG. 1, a cylinder device C1 according to a first embodiment includes the following: a cylinder 1; a piston 2 that is slidably inserted into the cylinder 1; a rod 3 that is inserted into the cylinder 1 and connected to the piston 2; an extension-side chamber R1 and a compression-side chamber R2 that are partitioned by the piston 2 within the cylinder 1; a tank T; an extension-side suction passage 4 that permits only the passage of liquid from the tank T toward the extension-side chamber R1; a compression-side suction passage 5 that permits only the passage of liquid from the tank T toward the compression-side chamber R2; a recess 2a that is provided on the outer periphery of the piston 2 and faces the cylinder 1; an extension-side discharge passage 6 that is provided in the piston 2 and permits only the flow of liquid from the extension-side chamber R1 toward the recess 2a; a compression-side discharge passage 7 that is provided in the piston 2 and permits only the flow of liquid from the compression-side chamber R2 toward the recess 2a; a tank-side discharge passage 8 that opens to the cylinder 1 and allows the extension-side discharge passage 6 and the compression-side discharge passage 7 to communicate with the tank T via the recess 2a; an extension-side damping passage 9 which serves as an extension-side damping force generation passage that applies a resistance to the flow of liquid from the extension-side chamber R1 toward the tank T; and a compression-side damping passage 10 which serves as a compression-side damping force generation passage that applies a resistance to the flow of liquid from the compression-side chamber R2 toward the tank T. A liquid such as hydraulic oil is filled in the extension-side chamber R1 and the compression-side chamber R2, and the tank T is filled with a gas in addition to a liquid. It is not particularly necessary to compress and fill a gas into the tank T to obtain a pressurized state, but the inside of the tank T may be pressurized.

Each part will now be explained below in detail. The cylinder 1 has a tube shape, and one end of the cylinder 1 (the right end in FIG. 1) is closed by a lid 15. An annular rod guide 16 is attached to the other end of the cylinder 1 (the left end in FIG. 1). The rod 3, which is movably inserted into the cylinder 1, is slidably inserted into the rod guide 16. One end of the rod 3 protrudes to the outside of the cylinder 1, and the other end within the cylinder 1 is connected to the piston 2 which is slidably inserted into the cylinder 1.

A space between the outer periphery of the rod 3 and the inner periphery of the rod guide 16 and a space between the outer periphery of the rod guide 16 and the cylinder 1 are sealed by a seal member (not illustrated). Thereby, the inside of the cylinder 1 is maintained in a tightly closed state. As explained above, hydraulic fluid is filled as a liquid into the extension-side chamber R1 and the compression-side chamber R2, which are partitioned by the piston 2 within the cylinder 1.

Figure 2:
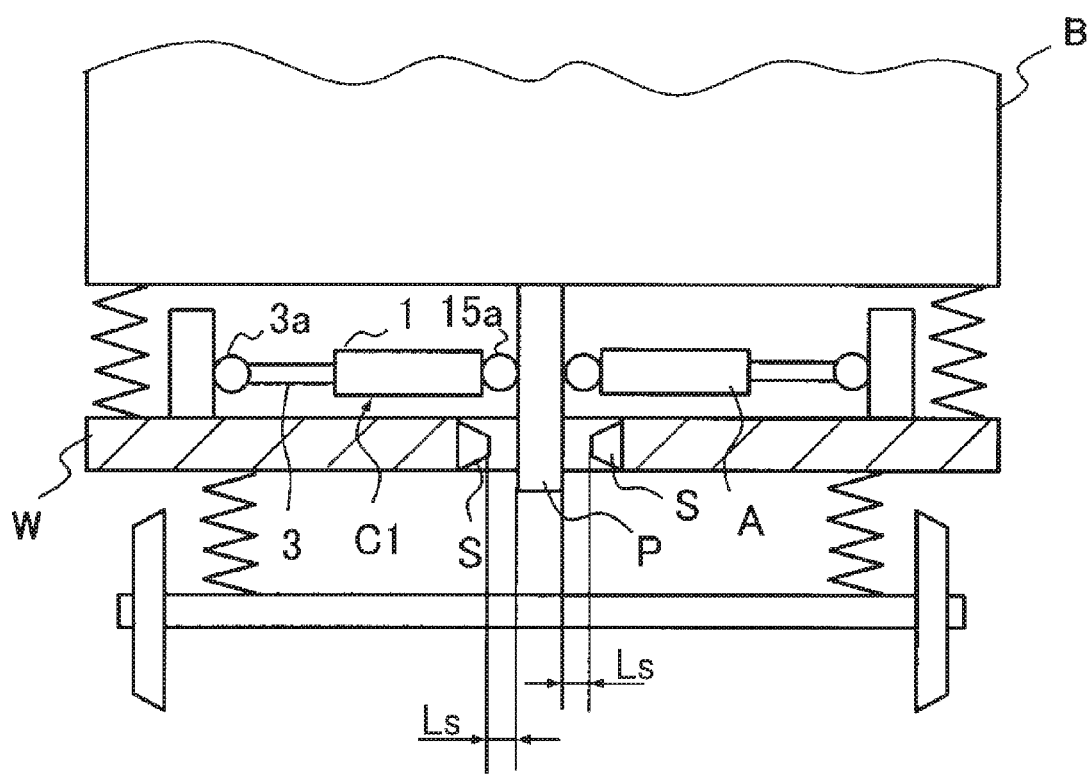
FIG. 2 illustrates the cylinder device of the first embodiment in a state of being interposed between a vehicle body and a carriage of a railway vehicle.

As shown in FIG. 2, attachment parts 3a and 15a are respectively provided to one end of the rod 3 (the left end in FIG. 1) and to the lid 15 that closes one end of the cylinder 1 (the right end in FIG. 1). The cylinder device C1 is connected by the attachment parts 3a and 15a to a center pin P of a vehicle body B and to a carriage W of the railway vehicle, which is the object to be damped. Independent of the cylinder device C1, an actuator A is also interposed between the center pin P and the carriage W. Further, a pair of stoppers S, S, which are disposed spaced apart from the center pin P to the left and the right of the center pin P, are provided to the carriage W. The stoppers S, S have elasticity, and the stoppers S are compressed when they abut against the center pin P. Thereby, the stoppers S exert a resilient force to suppress displacement in a direction in which the center pin P compresses the stoppers S. Therefore, if the vehicle body B strokes relative to the carriage W equal to or greater than a distance Ls from the stroke center, the stoppers S abut against the center pin P to suppress the movement of the vehicle body B while gradually increasing the resilient force. When the stoppers S are maximally compressed, they restrict any further displacement of the vehicle body B to stop the vehicle body B.

As shown in FIG. 1, the extension-side suction passage 4 opens from the rod guide 16 to allows the extension-side chamber R1 to communicate with the tank T. In the extension-side suction passage 4, a check valve 4a which permits only the flow of liquid from the tank T toward the extension-side chamber R1 is provided. Thereby, the extension-side suction passage 4 is set as a unidirectional passage that permits only the passage of liquid from the tank T toward the extension-side chamber R1.

Further, the extension-side chamber R1 communicates with the tank T via the extension-side damping passage 9 which opens at the rod guide 16. A relief valve 9a, which serves as a damping force generation element, is provided in the extension-side damping passage 9. The relief valve 9a is a passive damping valve which opens the extension-side damping passage 9 when a valve-opening pressure is reached. Thereby, the relief valve 9a applies a resistance to the flow of liquid therethrough while permitting only the flow of liquid from the extension-side chamber R1 toward the tank T.

The compression-side suction passage 5 opens from the lid 15 to allows the compression-side chamber R2 to communicate with the tank T. In the compression-side suction passage 5, a check valve 5a which permits only the flow of liquid from the tank T toward the compression-side chamber R2 is provided. Thereby, the compression-side suction passage 5 is set as a unidirectional passage that permits only the passage of liquid from the tank T toward the compression-side chamber R2.

Further, the compression-side chamber R2 communicates with the tank T via the compression-side damping passage 10 which opens at the lid 15. A relief valve 10a, which serves as a damping force generation element, is provided in the compression-side damping passage 10. The relief valve 10a is a passive damping valve which opens the compression-side damping passage 10 when a valve-opening pressure is reached. Thereby, the relief valve 10a applies a resistance to the flow of liquid therethrough while permitting only the flow of liquid from the compression-side chamber R2 toward the tank T.

A recess 2a, which is formed as an annular groove, is provided on the outer periphery of the piston 2. An axial direction width L1 of the recess 2a is set to be two times as long as the distance Ls between the center pin P and the stopper S in a state in which the vehicle body B is disposed at the stroke center relative to the carriage W. An extension-side discharge passage 6, which opens at the end on the extension-side chamber R1 side of the piston 2 and allows the extension-side chamber R1 to communicate with the recess 2a, is provided in the piston 2. A check valve 6a, which permits only the flow of liquid from the extension-side chamber R1 toward the recess 2a, is provided in the extension-side discharge passage 6. Thereby, the extension-side discharge passage 6 is set as a passage that permits only the flow of liquid from the extension-side chamber R1 toward the recess 2a. Further, a compression-side discharge passage 7, which opens at the end on the compression-side chamber R2 side of the piston 2 and allows the compression-side chamber R2 to communicate with the recess 2a, is provided in the piston 2. A check valve 7a, which permits only the flow of liquid from the compression-side chamber R2 toward the recess 2a, is provided in the compression-side discharge passage 7. Thereby, the compression-side discharge passage 7 is set as a passage that permits only the flow of liquid from the compression-side chamber R2 toward the recess 2a. The entirety of the extension-side discharge passage 6 and the compression-side discharge passage 7 does not have to be provided within the piston 2, and a portion thereof can be provided within the rod 3.

The tank-side discharge passage 8 opens from the inner periphery of the cylinder 1 and communicates with the tank T. Specifically, a port 1a, which penetrates through the cylinder 1 in the radial direction and forms a portion of the tank-side discharge passage 8, is provided in the cylinder 1. When the piston 2 displaces relative to the cylinder 1 equal to or greater than L1/2 in the left direction in FIG. 1 from a neutral position, the port 1a is blocked once by the outer periphery of the piston 2 in response to the piston displacement of L1/2 or more, and subsequently the port 1a communicates with the compression-side chamber R2 when the piston displacement proceeds further. Conversely, when the piston 2 displaces relative to the cylinder 1 equal to or greater than L1/2 in the right direction in FIG. 1 from a neutral position, the port 1a is blocked once by the outer periphery of the piston 2 in response to the piston displacement of L1/2 or more, and subsequently the port 1a communicates with the extension-side chamber R1 when the piston displacement proceeds further. In a state in which the port 1a opposes the recess 2a of the piston 2, the tank-side discharge passage 8 allows the extension-side discharge passage 6 and the compression-side discharge passage 7 to communicate with the tank T via the recess 2a. Further, if the piston 2 is located more toward the left side in FIG. 1 from the port 1a, the compression-side chamber R2 communicates with the tank T via only the tank-side discharge passage 8, and if the piston 2 is located more toward the right side in FIG. 1 from the port 1a, the extension-side chamber R1 communicates with the tank T via only the tank-side discharge passage 8. The neutral position of the piston 2 relative to the cylinder 1 does not necessarily have to be the center of the cylinder 1, and the neutral position can be a position at which the piston 2 is disposed relative the cylinder 1 when the cylinder device C1 is attached between the vehicle body B and the carriage W of the railway vehicle and the center pin P is positioned in the middle of the stoppers S, S.

An opening and closing valve 17, which opens and shuts off the tank-side discharge passage 8, is provided in the tank-side discharge passage 8. The opening and closing valve 17 is an electromagnetic opening and closing valve including a valve main body 17a which has a communication position that opens the tank-side discharge passage 8 and a blocked position that shuts off the tank-side discharge passage 8, a spring 17b that biases the valve main body 17a to position it in the blocked position, and a solenoid 17c that, when electrified, switches the valve main body 17a to the communication position against the biasing force of the spring 17b.

The cylinder device C1 is constituted as described above. Below, the operation of the cylinder device C1 will be explained. First, a case in which the opening and closing valve 17 shuts off the tank-side discharge passage 8 will be explained. In this case, when the piston 2 moves relative to the cylinder 1 to the left direction in FIG. 1, or in other words when the cylinder device C1 extends, the extension-side chamber R1 is compressed, and resistance is applied by the relief valve 9a to the flow of liquid discharged from the extension-side chamber R1 to the tank T via the extension-side damping passage 9. Thus, the pressure within the extension-side chamber R1 rises in accordance with the pressure loss of the relief valve 9a. On the other hand, the check valve 5a in the compression-side suction passage 5 opens and liquid from the tank T is supplied to the compression-side chamber R2 which is expanded, and thus the pressure within the compression-side chamber R2 becomes the tank pressure. Thereby, the pressure of the extension-side chamber R1 increases higher than the pressure of the compression-side chamber R2, and the cylinder device C1 exerts a damping force in a direction to suppress the extension in a magnitude corresponding to the difference between the pressure of the extension-side chamber R1 and the pressure of the compression-side chamber R2. In contrast, when the piston 2 moves relative to the cylinder 1 to the right direction in FIG. 1, or in other words when the cylinder device C1 contracts, the compression-side chamber R2 is compressed. At this time, resistance is applied by the relief valve 10a to the flow of liquid discharged from the compression-side chamber R2 to the tank T via the compression-side damping passage 10. Thus, the pressure within the compression-side chamber R2 rises in accordance with the pressure loss of the relief valve 10a. On the other hand, the check valve 4a in the extension-side suction passage 4 opens and liquid from the tank T is supplied to the extension-side chamber R1 which is expanded, and thus the pressure within the extension-side chamber R1 becomes the tank pressure. Thereby, the pressure of the compression-side chamber R2 increases higher than the pressure of the extension-side chamber R1, and the cylinder device C1 exerts a damping force in a direction to suppress the contraction in a magnitude corresponding to the difference between the pressure of the compression-side chamber R2 and the pressure of the extension-side chamber R1. Accordingly, in the case that the opening and closing valve 17 shuts off the tank-side discharge passage 8, similar to a general damper, the cylinder device C1 exerts a damping force during the stroke in both the extension operation and the contraction operation.

Next, a case in which the opening and closing valve 17 enables the tank-side discharge passage 8 to communicate will be explained. When the piston 2 strokes in a range within a distance L1/2 from the neutral position relative to the cylinder 1, the port 1a of the tank-side discharge passage 8 is in constant communication with the recess 2a. If the piston 2 strokes to the left within this range, liquid is discharged from the extension-side chamber R1 which is compressed to the tank T via the extension-side discharge passage 6, the recess 2a, and the tank-side discharge passage 8, and thus the extension-side chamber R1 is maintained at the tank pressure. Liquid is also supplied from the tank T via the compression-side suction passage 5 to the compression-side chamber R2 which is expanded, and thus the compression-side chamber R2 is also maintained at the tank pressure. At this time, since there is almost no pressure difference between the extension-side chamber R1 and the tank T, the extension-side damping passage 9 is in a blocked state. Conversely, when the piston 2 strokes to the right in a range within a distance L1/2 from the neutral position, liquid is discharged from the compression-side chamber R2 which is compressed to the tank T via the compression-side discharge passage 7, the recess 2a, and the tank-side discharge passage 8, and thus the compression-side chamber R2 is maintained at the tank pressure. Liquid is also supplied from the tank T via the extension-side suction passage 4 to the extension-side chamber R1 which is expanded, and thus the extension-side chamber R1 is also maintained at the tank pressure. At this time, since there is almost no pressure difference between the compression-side chamber R2 and the tank T, the compression-side damping passage 10 is in a blocked state. In this way, in the case that the piston 2 strokes in a range within a distance L1/2 from the neutral position relative to the cylinder 1 and the port 1a of the tank-side discharge passage 8 is constantly maintained in a state of communication with the recess 2a, the cylinder device C1 enters a state in which it exerts almost no damping force against the oscillation input. A stroke range in which the cylinder device C1 exerts almost no damping force is realized by the communication between the recess 2a and the port 1a. Therefore, the stroke range in which almost no damping force is exerted is set by setting the axial direction width of the recess 2a. In the cylinder device C1 of the present embodiment, this range is set by setting the axial direction width L1 of the recess 2a to double the distance Ls between the center pin P and the stopper S in a state in which the center pin P is in the stroke center. Thereby, until the center pin P abuts the stopper S, the cylinder device C1 is maintained in a state in which it outputs almost no damping force.

In contrast, in the case that the piston 2 strokes beyond the range within a distance L1/2 from the neutral position relative to the cylinder 1 such that the port 1a of the tank-side discharge passage 8 is blocked by the piston 2, the cylinder device C1 enters a state which is identical to the state when the opening and closing valve 17 is closed. Thus, the cylinder device C1 exerts a damping force according to the extension and contraction. Further, since the port 1a is gradually closed when the displacement of the piston 2 proceeds, the cylinder device C1 gradually increases the damping force until the port 1a is completely blocked by the displacement of the piston 2.

Accordingly, in a range in which the center pin P abuts the stopper S and the piston 2 blocks the port 1a, the cylinder device C1 exerts a damping force, and this exerted damping force suppresses the center pin P from separating from the stroke center. In this way, the cylinder device C1 can exert a damping force depending on the position of the vehicle body B relative to the carriage W without providing a stroke sensor. When the center pin P collides with the stopper S, the cylinder device C1 exerts a damping force to gradually suppress the displacement of the vehicle body B relative to the carriage W, and thus uncomfortable oscillations are not imparted to the vehicle body B at the stroke end and a good riding comfort can be ensured. Further, the cylinder device C1 does not exert a force to suppress displacement of the vehicle body B relative to the carriage W until the center pin P abuts the stopper S. Therefore, in the range in which the center pin P does not abut the stopper S, the cylinder device C1 does not exert a damping force which counteracts a control force for suppressing oscillation of the vehicle body B that is exerted by the actuator A, which is provided in combination with the cylinder device C1, while the actuator A is exerting this control force. Thus, the energy consumption of the actuator A can be reduced without harming the riding comfort in the railway vehicle.

When the piston 2 is located more toward the left side in FIG. 1 from the port 1a of the tank-side discharge passage 8 and the piston 2 strokes in a direction to compress the extension-side chamber R1, i.e. the left direction in FIG. 1, the extension-side chamber R1 is compressed and resistance is applied by the relief valve 9a to the flow of liquid discharged from the extension-side chamber R1 to the tank T via the extension-side damping passage 9, and liquid is supplied from the tank T to the compression-side chamber R2 which is expanded via the tank-side discharge passage 8 and the compression-side suction passage 5. Thereby, the cylinder device C1 exerts a damping force to oppose the extension. In contrast, when the piston 2 is located more toward the left side in FIG. 1 from the port 1a of the tank-side discharge passage 8 and the piston 2 strokes in a direction to compress the compression-side chamber R2, i.e. the right direction in FIG. 1, the compression-side chamber R2 communicates with the tank T via the tank-side discharge passage 8, and thus liquid is discharged from the compression-side chamber R2 which is compressed to the tank T via the tank-side discharge passage 8. Therefore, the pressure within the compression-side chamber R2 becomes the tank pressure. Liquid is also supplied from the tank T via the extension-side suction passage 4 to the extension-side chamber R1 that is expanded, and thus the inside of the extension-side chamber R1 also becomes the tank pressure. Accordingly, a difference cannot be generated between the pressure of the extension-side chamber R1 and the pressure of the compression-side chamber R2, and the cylinder device C1 exerts almost no damping force. This state is maintained until the piston 2 opposes the port 1a to block the tank-side discharge passage 8, and thus the cylinder device C1 does not exert a damping force until the piston 2 strokes in a direction to compress the compression-side chamber R2 from a state in which the piston 2 is located more toward the left side in FIG. 1 from the port 1a of the tank-side discharge passage 8 so that the piston 2 blocks the tank-side discharge passage 8.

When the piston 2 is located more toward the right side in FIG. 1 from the port 1a of the tank-side discharge passage 8 and the piston 2 strokes in a direction to compress the compression-side chamber R2, i.e. the right direction in FIG. 1, the compression-side chamber R2 is compressed and resistance is applied by the relief valve 10a to the flow of liquid discharged from the compression-side chamber R2 to the tank T via the compression-side damping passage 10, and liquid is supplied from the tank T to the extension-side chamber R1 which is expanded via the tank-side discharge passage 8 and the extension-side suction passage 4. Thereby, the cylinder device C1 exerts a damping force to oppose the contraction. In contrast, when the piston 2 is located more toward the right side in FIG. 1 from the port 1a of the tank-side discharge passage 8 and the piston 2 strokes in a direction to compress the extension-side chamber R1, i.e. the left direction in FIG. 1, the extension-side chamber R1 communicates with the tank T via the tank-side discharge passage 8, and thus liquid is discharged from the extension-side chamber R1 which is compressed to the tank T via the tank-side discharge passage 8. Therefore, the pressure within the extension-side chamber R1 becomes the tank pressure. Liquid is also supplied from the tank T via the compression-side suction passage 5 to the compression-side chamber R2 that is expanded, and thus the inside of the compression-side chamber R2 also becomes the tank pressure. Accordingly, a difference cannot be generated between the pressure of the extension-side chamber R1 and the pressure of the compression-side chamber R2, and the cylinder device C1 exerts almost no damping force. This state is maintained until the piston 2 opposes the port 1a to block the tank-side discharge passage 8, and thus the cylinder device C1 does not exert a damping force until the piston 2 strokes in a direction to compress the extension-side chamber R1 from a state in which the piston 2 is located more toward the right side in FIG. 1 from the port 1a of the tank-side discharge passage 8 so that the piston 2 blocks the tank-side discharge passage 8.

In this way, when the cylinder device C1 strokes within a range in which the tank-side discharge passage 8 opposes the recess 2a, the cylinder device C1 reduces the damping force with the above-mentioned range as a thrust reducing stroke range, or in other words the cylinder device C1 enters a dead zone in which it does not exert a damping force. Further, when the piston 2 strokes beyond the above-mentioned stroke range, if this stroke is in a direction away from the neutral position, the cylinder device C1 exerts a damping force against this stroke in a direction to return the piston 2 back to the neutral position. If the stroke is in a direction in which the piston 2 is returning back to the neutral position, the cylinder device C1 does not exert a damping force to hinder this stroke until the piston 2 returns to a position at which the tank-side discharge passage 8 is blocked.

In this way, the cylinder device C1 reduces the damping force during a stroke in the dead zone range, or in other words until the center pin P of the vehicle body B abuts the stopper S, and thus does not disturb the oscillation suppression control of the vehicle body B by the control force of the actuator A.

In addition, when the stroke proceeds beyond the dead zone range, or in other words when the center pin P abuts the stopper S, the cylinder device C1 exerts a damping force that assists in the suppression of displacement of the vehicle body B by the resilient force exerted by the stopper S, and thereby any further displacement of the vehicle body B is suppressed. Therefore, the movement speed toward the stroke end side of the vehicle body B decreases, and impacts of the vehicle body B at the stroke end are mitigated. Further, in the case that the stroke proceeds beyond the dead zone range and the actuator A causes the vehicle body B to move toward the stroke end side, the cylinder device C1 exerts a damping force to suppress this movement so that displacement of the vehicle body B can be suppressed, and if the vehicle body B moves in a direction to return back to the stroke center, the cylinder device C1 does not exert a damping force which would hinder this movement. Therefore, the vehicle body B can be quickly returned to the stroke center. In addition, it is not necessary to provide a stroke sensor for sensing the displacement, and the thrust reducing stroke range in which the damping force is reduced can be set in the cylinder device C1. Thus, the operation of the cylinder device C1 can always be stabilized. Accordingly, the cylinder device C1 can improve the riding comfort of the railway vehicle.

As mentioned above, the opening and closing valve 17 is provided in the tank-side discharge passage 8. By providing this opening and closing valve 17, the tank-side discharge passage 8 can be switched between enabled and disabled. If the tank-side discharge passage 8 is disabled by closing the opening and closing valve 17, the cylinder device C1 can function as a general passive damper that does not have a thrust reducing stroke range. If the opening and closing valve 17 is opened, the cylinder device C1 can function as a damper which has a thrust reducing stroke range, which is a dead zone in which a damping force is not exerted. Further, the opening and closing valve 17 is configured to enter a blocked position when not energized, and thus the opening and closing valve 17 is in the blocked position during a failure in which energization of the valve is impossible or the valve cannot be switched for some reason. Therefore, the cylinder device C1 can be automatically transitioned into a mode in which oscillation of the vehicle body B is constantly suppressed. In addition to the cylinder device C1, the actuator A that is provided in combination with the cylinder device C1 is also advantageous in that it can suppress oscillation of the vehicle body B even in a failure state. However, the opening and closing valve 17 does not have to be provided when configuring the cylinder device C1 to function as a damper which has a thrust reducing stroke range in which a damping force is not exerted. As shown by the dashed lines in FIG. 1, if a throttle valve 8a which serves as a damping force generation element is provided in the tank-side discharge passage 8, the cylinder device C1 can also exert a damping force during a stroke in the thrust reducing stroke range that is lower than the damping force generated by the extension-side damping passage 9 and the compression-side damping passage 10. In addition, as shown by the dashed lines in FIG. 1, if a relief valve 8b which serves as a damping force generation element is provided in the tank-side discharge passage 8 in parallel with the opening and closing valve 17 or in parallel with the throttle valve 8a in the case that the opening and closing valve 17 is eliminated so that a resistance is applied by the relief valve 8b when a liquid flows through the tank-side discharge passage 8, the cylinder device C1 can be set so that it necessarily exerts a damping force regardless of the direction of the stroke when the cylinder device C1 strokes outside of the thrust reducing stroke range. If a damping force generation element is provided to the tank-side discharge passage 8, the cylinder device C1 exerts a low damping force in the thrust reducing stroke range, and thus can reduce the opportunities for collision between the center pin P and the stopper S.

In the above-described embodiment, the axial direction width L1 of the recess 2a is set to double the distance Ls between the stopper S and the center pin P. However, in the case that it is desired for the cylinder device C1 to exert a damping force before the center pin P collides with the stopper S, the axial direction width L1 should be set such that L1<Ls×2. In the case that it is desired for the cylinder device C1 to exert a damping force after the center pin P has collided with the stopper S, the axial direction width L1 should be set such that L1>Ls×2. The thrust reducing stroke range in which the thrust of the cylinder device C1 is reduced can be set by setting the axial direction width of the recess 2a, and thus tuning of this range is extremely easy. Furthermore, in the thrust reducing stroke range, the rigidity between the vehicle body B and the carriage W does not increase, and thus oscillations can be insulated without transmitting oscillation of the carriage W to the vehicle body B. The axial direction width L1 of the recess 2a can be set so as to optimize the riding comfort of the vehicle body B based on the rigidity of the stoppers S, the stroke amount of the center pin P from abutting the center pin P to stopping the center pin P at maximum compression, and the like.

Figure 3:
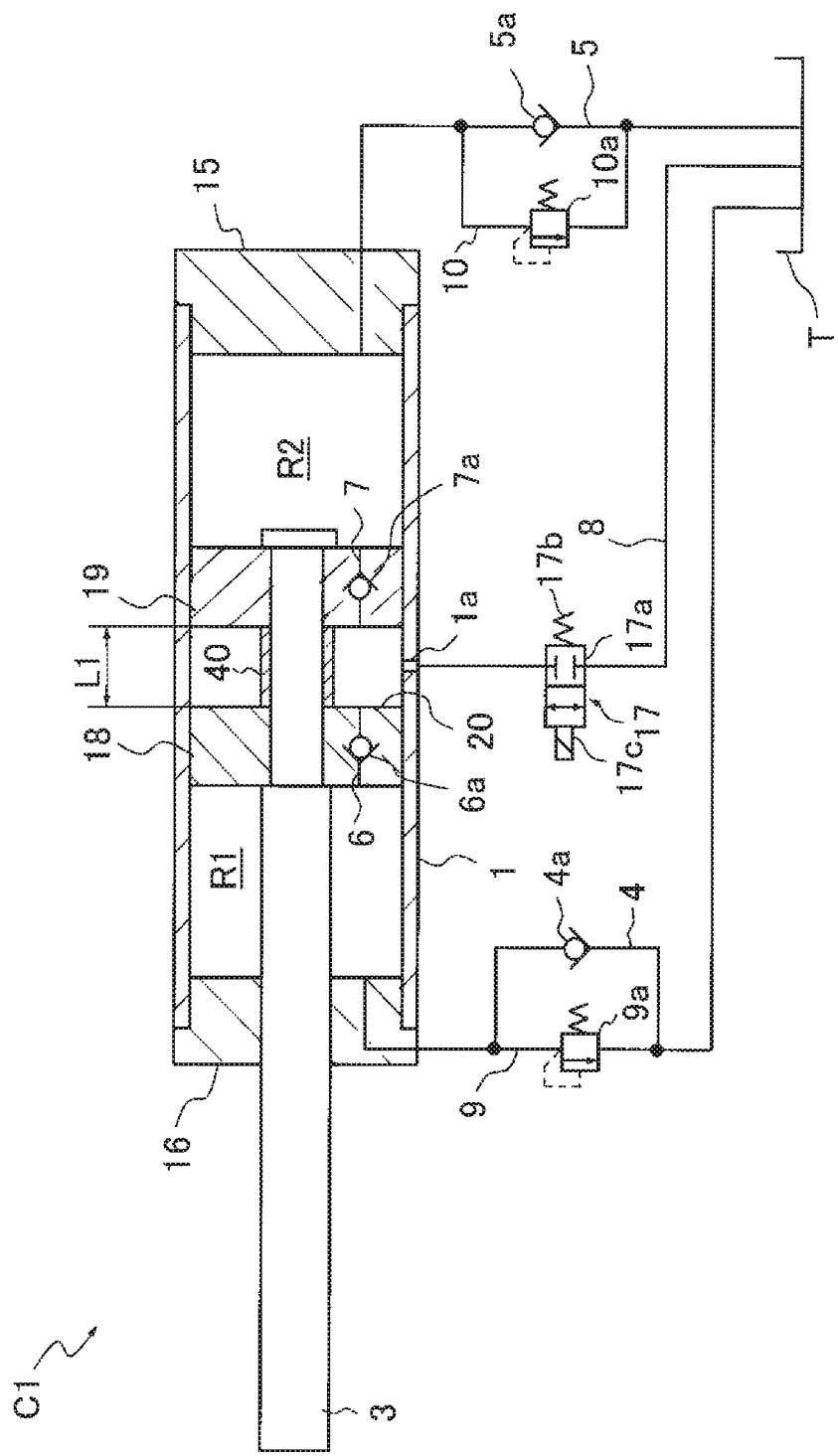
FIG. 3 is a schematic view of an alternative embodiment of the cylinder device according to the first embodiment.

The recess 2a is formed by providing an annular groove on the outer periphery of the piston 2. However, the piston 2 can also be constituted as shown in FIG. 3. Specifically, the piston 2 is constituted by the following: a first piston forming member 18 that is disc shaped and is provided on the rod 3 and slidingly contacts the cylinder 1; and a second piston forming member 19 that is disc shaped and is provided on the rod 3 separated from the first piston forming member 18 and slidingly contacts the cylinder 1. A recess 20 is formed as an annular gap formed between the first piston forming member 18 and the second piston forming member 19. In this way, the piston 2 can be constituted by two disc-shaped members, i.e. the first piston forming member 18 and the second piston forming member 19, and the recess 20 that is partitioned from the extension-side chamber R1 and the compression-side chamber R2 can be provided between the first piston forming member 18 and the second piston forming member 19. The extension-side discharge passage 6 can be provided to the first piston forming member 18 that partitions the extension-side chamber R1 and the recess 20, and the compression-side discharge passage 7 can be provided to the second piston forming member 19 that partitions the compression-side chamber R2 and the recess 20. The width of the recess 20 can be easily adjusted by installing a cylindrical spacer 40 on the outer periphery of the rod 3 between the first piston forming member 18 and the second piston forming member 19. Furthermore, in the case that it is necessary to increase the axial direction length of the recess 20, forming this kind of recess on the outer periphery of the single piston 2 increases the axial direction length of the piston 2 but also increases the weight of the piston 2. However, constituting the piston 2 with the first piston forming member 18 and the second piston forming member 19 does not lead to weight increases even though the axial direction length of the recess 20 increases. Further, constituting the piston 2 with the first piston forming member 18 and the second piston forming member 19 also facilitates the installation of the extension-side discharge passage 6 and the compression-side discharge passage 7. The extension-side discharge passage 6 and the compression-side discharge passage 7 can be provided in the rod 3 rather than provided in the first piston forming member 18 and the second piston forming member 19 respectively. However, in the case that the check valve 6a is constituted by a leaf valve, the extension-side discharge passage 6 can be easily constituted by providing a port which forms the passage of the extension-side discharge passage 6 to the first piston forming member 18 and laminating a leaf valve which is mounted onto the outer periphery of the rod 3 on the recess side of the first piston forming member 18. In the case that the check valve 7a is constituted by a leaf valve, the compression-side discharge passage 7 can also be easily constituted by providing a port which forms the passage of the compression-side discharge passage 7 to the second piston forming member 19 and laminating a leaf valve which is mounted onto the outer periphery of the rod 3 on the recess side of the second piston forming member 19.

Figure 4:
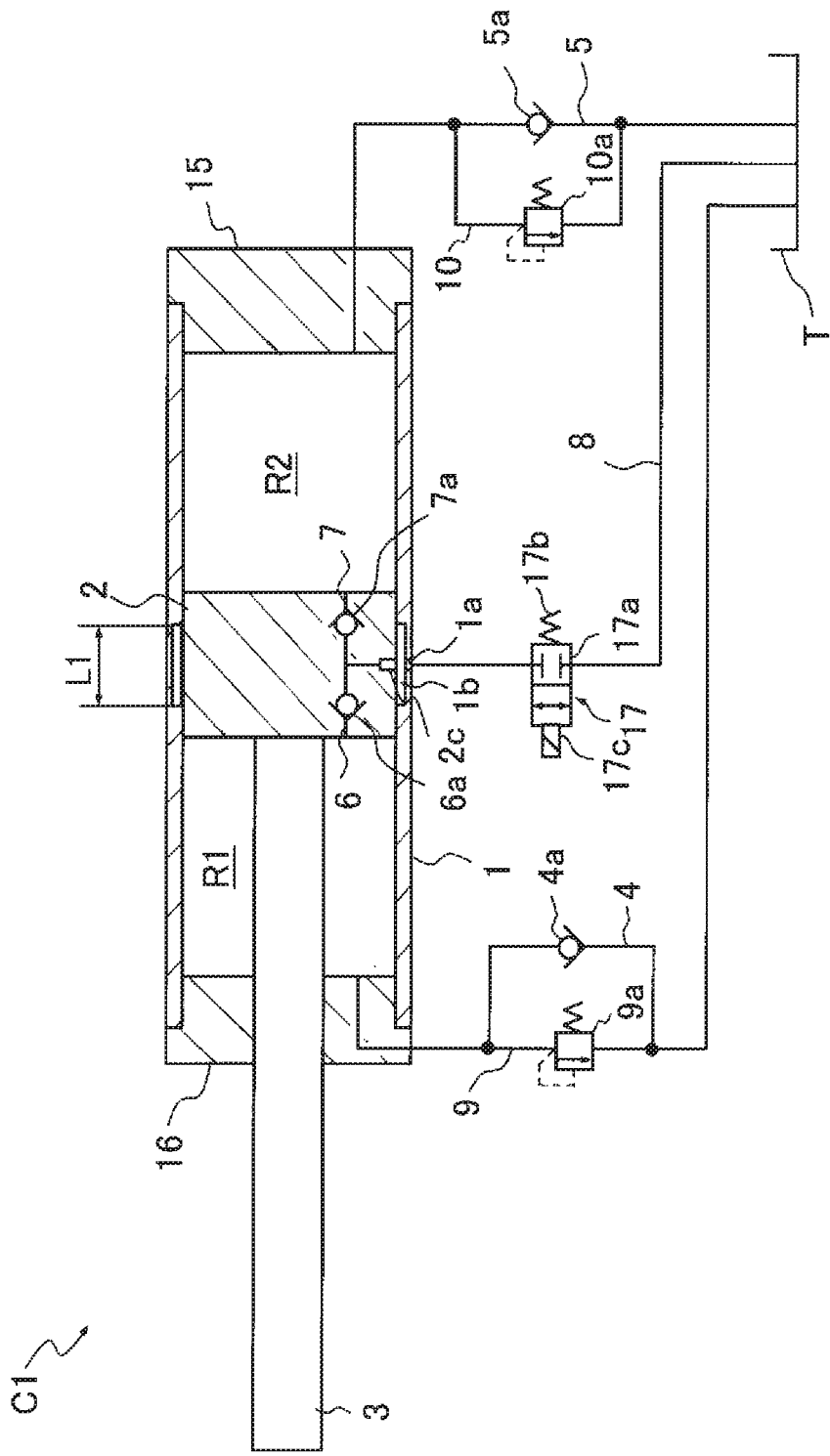
FIG. 4 is a schematic view of another alternative embodiment of the cylinder device according to the first embodiment.

As shown in FIG. 4, rather than providing the recess 2a in the piston 2, a recess 1b can be formed by providing an annular groove instead of providing the port 1a on the inner periphery of the cylinder 1, and this recess 1b can be made to communicate with the tank T by the tank-side discharge passage 8. Further, the extension-side discharge passage 6 and the compression-side discharge passage 7 can be provided in the piston 2 and an outlet port 2c for the discharge passages can be provided on the outer periphery of the piston 2. In this case as well, the entirety of the extension-side discharge passage 6 and the compression-side discharge passage 7 does not have to be provided within the piston 2, and a portion thereof can be provided within the rod 3. Even with such a constitution, in a state in which the recess 1b faces the outlet port 2c, the extension-side discharge passage 6 and the compression-side discharge passage 7 are placed in a state of communication with the tank-side discharge passage 8, and thus the cylinder device C1 does not exert a damping force. Therefore, in the cylinder device C1 in which the recess 1b is provided to the cylinder 1, the operation is similar to that of the cylinder device C1 shown in FIG. 1, and similar effects can be achieved. However, the axial direction length of the piston 2 must be set to a length that is at least double the axial direction length of the recess 1b.

In this way, the recess 2a, 1b can be formed by an annular groove provided on the outer periphery of the piston 2, or the recess 2a, 1b can be formed by an annular groove provided on the inner periphery of the cylinder 1. Further, since the recess 2a, 1b, 20 is annular, the communication of the extension-side discharge passage 6 and the compression-side discharge passage 7 with the tank-side discharge passage 8 is ensured via the recess 2a, 1b, 20 even if the piston 2 rotates in the circumferential direction relative to the cylinder 1.

The relief valves 9a, 10a, and 8b can be configured to generate a damping force, and thus these relief valves can be changed to a damping valve or throttle valve which has no valve-opening pressure setting.

Second Embodiment

Figure 5:
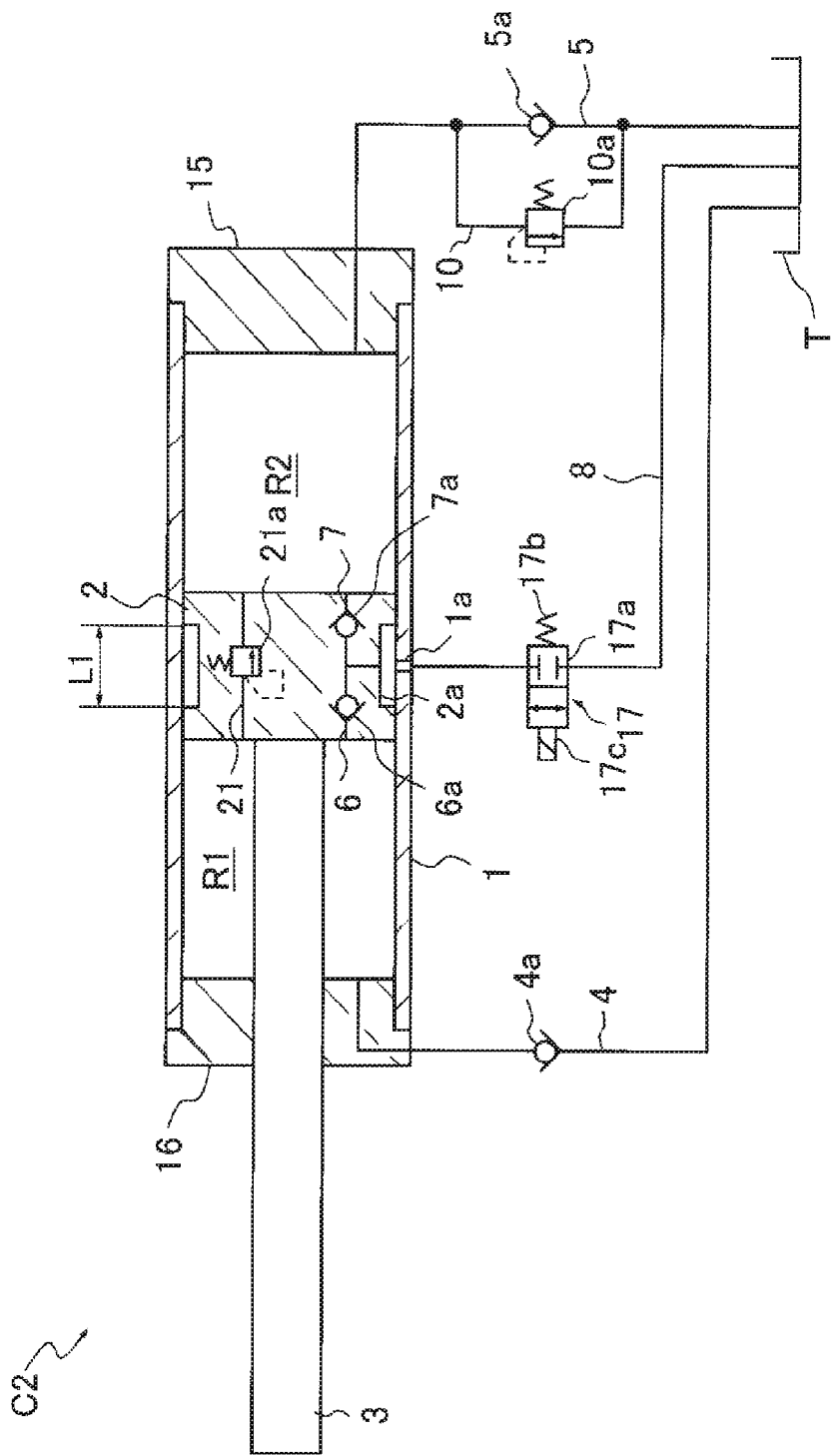
FIG. 5 is a schematic view of a cylinder device according to a second embodiment.

Next, a cylinder device C2 according to a second embodiment will be explained. As shown in FIG. 5, the cylinder device C2 includes the following: a cylinder 1; a piston 2 that is slidably inserted into the cylinder 1; a rod 3 that is inserted into the cylinder 1 and connected to the piston 2; an extension-side chamber R1 and a compression-side chamber R2 that are partitioned by the piston 2 within the cylinder 1; a tank T; an extension-side suction passage 4 that permits only the passage of liquid from the tank T toward the extension-side chamber R1; a compression-side suction passage 5 that permits only the passage of liquid from the tank T toward the compression-side chamber R2; a recess 2a that is provided on the outer periphery of the piston 2 and faces the cylinder 1; an extension-side discharge passage 6 that is provided in the piston 2 and permits only the flow of liquid from the extension-side chamber R1 toward the recess 2a; a compression-side discharge passage 7 that is provided in the piston 2 and permits only the flow of liquid from the compression-side chamber R2 toward the recess 2a; a tank-side discharge passage 8 that opens to the cylinder 1 and allows the extension-side discharge passage 6 and the compression-side discharge passage 7 to communicate with the tank T via the recess 2a; an extension-side communication passage 21 which serves as an extension-side damping force generation passage that applies a resistance to the flow of liquid from the extension-side chamber R1 toward the compression-side chamber R2; and a compression-side damping passage 10 which serves as a compression-side damping force generation passage that applies a resistance to the flow of liquid from the compression-side chamber R2 toward the tank T. In this way, the cylinder device C2 has the same constitution as the cylinder device C1 of the first embodiment, except that the extension-side damping passage 9 of the constitution of the cylinder device C1 is eliminated and replaced with the extension-side communication passage 21.

The extension-side communication passage 21 allows the extension-side chamber R1 to communicate with the compression-side chamber R2, and a relief valve 21a is provided in the extension-side communication passage 21. The relief valve 21a is a passive damping valve which opens the extension-side communication passage 21 when a valve-opening pressure is reached. Thereby, the relief valve 21a applies a resistance to the flow of liquid therethrough while permitting only the flow of liquid from the extension-side chamber R1 toward the compression-side chamber R2.

Next, the operation of the cylinder device C2 will be explained. First, a case in which the opening and closing valve 17 shuts off the tank-side discharge passage 8 will be explained. In this case, when the piston 2 moves relative to the cylinder 1 to the left direction in FIG. 5, or in other words when the cylinder device C2 extends, the extension-side chamber R1 is compressed. At this time, a resistance is applied by the relief valve 21a to the flow of liquid from the extension-side chamber R1 to the compression-side chamber R2 via the extension-side communication passage 21. Thus, the pressure within the extension-side chamber R1 rises in accordance with the pressure loss of the relief valve 21a. On the other hand, liquid from the extension-side chamber R1 is supplied via the extension-side communication passage 21 to the compression-side chamber R2 which is expanded. However, the liquid is insufficient in an amount equal to the volume of the rod 3 retreating from the cylinder 1, and thus liquid is supplied from the tank T via the compression-side suction passage 5. Therefore, the pressure within the compression-side chamber R2 becomes the tank pressure. Thereby, the pressure of the extension-side chamber R1 increases higher than the pressure of the compression-side chamber R2, and the cylinder device C2 exerts a damping force in a direction to suppress the extension in a size corresponding to the difference between the pressure of the extension-side chamber R1 and the pressure of the compression-side chamber R2.

In contrast, when the piston 2 moves relative to the cylinder 1 to the right direction in FIG. 5, or in other words when the cylinder device C2 contracts, the compression-side chamber R2 is compressed. At this time, resistance is applied by the relief valve 10a to the flow of liquid discharged from the compression-side chamber R2 to the tank T via the compression-side damping passage 10. Thus, the pressure within the compression-side chamber R2 rises in accordance with the pressure loss of the relief valve 10a. On the other hand, the check valve 4a in the extension-side suction passage 4 opens and liquid from the tank T is supplied to the extension-side chamber R1 which is expanded, and thus the pressure within the extension-side chamber R1 becomes the tank pressure. Thereby, the pressure of the compression-side chamber R2 increases higher than the pressure of the extension-side chamber R1, and the cylinder device C2 exerts a damping force in a direction to suppress the contraction in a size corresponding to the difference between the pressure of the compression-side chamber R2 and the pressure of the extension-side chamber R1. Accordingly, in the case that the opening and closing valve 17 shuts off the tank-side discharge passage 8, similar to a general damper, the cylinder device C2 exerts a damping force during the stroke in both the extension operation and the contraction operation.

Next, a case in which the opening and closing valve 17 enables the tank-side discharge passage 8 to communicate will be explained. When the piston 2 strokes in a range within a distance L1/2 from the neutral position relative to the cylinder 1, the port 1a of the tank-side discharge passage 8 is in constant communication with the recess 2a. If the piston 2 strokes to the left within this range, liquid is discharged from the extension-side chamber R1 which is compressed to the tank T via the extension-side discharge passage 6, the recess 2a, and the tank-side discharge passage 8, and thus the extension-side chamber R1 is maintained at the tank pressure. Liquid is also supplied from the tank T via the compression-side suction passage 5 to the compression-side chamber R2 which is expanded, and thus the compression-side chamber R2 is also maintained at the tank pressure. At this time, since there is almost no pressure difference between the extension-side chamber R1 and the compression-side chamber R2, the extension-side communication passage 21 is in a blocked state. Conversely, when the piston 2 strokes to the right in a range within a distance L1/2 from the neutral position, liquid is discharged from the compression-side chamber R2 which is compressed to the tank T via the compression-side discharge passage 7, the recess 2a, and the tank-side discharge passage 8, and thus the compression-side chamber R2 is maintained at the tank pressure. Liquid is also supplied from the tank T via the extension-side suction passage 4 to the extension-side chamber R1 which is expanded, and thus the extension-side chamber R1 is also maintained at the tank pressure. At this time, since there is almost no pressure difference between the compression-side chamber R2 and the tank T, the compression-side damping passage 10 is in a blocked state. In this way, in the case that the piston 2 strokes in a range within a distance L1/2 from the neutral position relative to the cylinder 1 and the port 1a of the tank-side discharge passage 8 is constantly maintained in a state of communication with the recess 2a, the cylinder device C2 enters a state in which it exerts almost no damping force against the oscillation input. Therefore, similar to the cylinder device C1, a thrust reducing stroke range is provided also in the cylinder device C2 in which the cylinder device C2 exerts almost no damping force due to the communication between the recess 2a and the port 1a. This thrust reducing stroke range is set by the axial direction width of the recess 2a.

In contrast, in the case that the piston 2 strokes beyond the range within a distance L1/2 from the neutral position relative to the cylinder 1 such that the port 1a of the tank-side discharge passage 8 is blocked by the piston 2, the cylinder device C2 enters a state which is identical to the state when the opening and closing valve 17 is closed. Thus, the cylinder device C2 exerts a damping force against the extension and contraction. Further, since the port 1a is gradually closed when the displacement of the piston 2 proceeds, the cylinder device C2 gradually increases the damping force until the port 1a is completely blocked by the displacement of the piston 2.

Accordingly, in a range in which the center pin P abuts the stopper S and the piston 2 blocks the port 1a, the cylinder device C2 exerts a damping force, and this exerted damping force suppresses the center pin P from separating from the stroke center. In this way, the cylinder device C2 can exert a damping force depending on the position of the vehicle body B relative to the carriage W without providing a stroke sensor. When the center pin P collides with the stopper S, the cylinder device C2 exerts a damping force to gradually suppress the displacement of the vehicle body B relative to the carriage W, and thus uncomfortable oscillations are not imparted to the vehicle body B at the stroke end and a good riding comfort can be ensured. Further, the cylinder device C2 does not exert a force to suppress displacement of the vehicle body B relative to the carriage W until the center pin P abuts the stopper S. Therefore, in the range in which the center pin P does not abut the stopper S, the cylinder device C2 does not exert a damping force which counteracts a control force for suppressing oscillation of the vehicle body B that is exerted by the actuator A, which is provided in combination with the cylinder device C2, while the actuator A is exerting this control force. Thus, the energy consumption of the actuator A can be reduced without harming the riding comfort in the railway vehicle.

When the piston 2 is located more toward the left side in FIG. 5 from the port 1a of the tank-side discharge passage 8 and the piston 2 strokes in a direction to compress the extension-side chamber R1, i.e. the left direction in FIG. 5, the extension-side chamber R1 is compressed and resistance is applied by the relief valve 21a to the flow of liquid discharged from the extension-side chamber R1 to the compression-side chamber R2 via the extension-side communication passage 21, and liquid is supplied from the tank T to the compression-side chamber R2 which is expanded via the tank-side discharge passage 8 and the compression-side suction passage 5. Therefore, the cylinder device C2 exerts a damping force to counteract the extension. In contrast, when the piston 2 is located more toward the left side in FIG. 5 from the port 1a of the tank-side discharge passage 8 and the piston 2 strokes in a direction to compress the compression-side chamber R2, i.e. the right direction in FIG. 5, the compression-side chamber R2 communicates with the tank T via the tank-side discharge passage 8, and thus liquid is discharged from the compression-side chamber R2 which is compressed to the tank T via the tank-side discharge passage 8. Therefore, the pressure within the compression-side chamber R2 becomes the tank pressure. Liquid is also supplied from the tank T via the extension-side suction passage 4 to the extension-side chamber R1 that is expanded, and thus the inside of the extension-side chamber R1 also becomes the tank pressure. Accordingly, a difference cannot be generated between the pressure of the extension-side chamber R1 and the pressure of the compression-side chamber R2, and the cylinder device C2 exerts almost no damping force. This state is maintained until the piston 2 opposes the port 1a to block the tank-side discharge passage 8, and thus the cylinder device C2 does not exert a damping force until the piston 2 strokes in a direction to compress the compression-side chamber R2 from a state in which the piston 2 is located more toward the left side in FIG. 5 from the port 1a of the tank-side discharge passage 8 so that the piston 2 blocks the tank-side discharge passage 8.

When the piston 2 is located more toward the right side in FIG. 5 from the port 1a of the tank-side discharge passage 8 and the piston 2 strokes in a direction to compress the compression-side chamber R2, i.e. the right direction in FIG. 5, the compression-side chamber R2 is compressed and resistance is applied by the relief valve 10a to the flow of liquid discharged from the compression-side chamber R2 to the tank T via the compression-side damping passage 10, and liquid is supplied from the tank T to the extension-side chamber R1 which is expanded via the tank-side discharge passage 8 and the extension-side suction passage 4. Therefore, the cylinder device C2 exerts a damping force to counteract the contraction. In contrast, when the piston 2 is located more toward the right side in FIG. 5 from the port 1a of the tank-side discharge passage 8 and the piston 2 strokes in a direction to compress the extension-side chamber R1, i.e. the left direction in FIG. 5, the extension-side chamber R1 communicates with the tank T via the tank-side discharge passage 8, and thus liquid is discharged from the extension-side chamber R1 which is compressed to the tank T via the tank-side discharge passage 8. Therefore, the pressure within the extension-side chamber R1 becomes the tank pressure. Liquid is also supplied from the tank T via the compression-side suction passage 5 to the compression-side chamber R2 that is expanded, and thus the inside of the compression-side chamber R2 also becomes the tank pressure. Accordingly, a difference cannot be generated between the pressure of the extension-side chamber R1 and the pressure of the compression-side chamber R2, and the cylinder device C2 exerts almost no damping force. This state is maintained until the piston 2 opposes the port 1a to block the tank-side discharge passage 8, and thus the cylinder device C2 does not exert a damping force until the piston 2 strokes in a direction to compress the extension-side chamber R1 from a state in which the piston 2 is located more toward the right side in FIG. 5 from the port 1a of the tank-side discharge passage 8 so that the piston 2 blocks the tank-side discharge passage 8.

In this way, when the cylinder device C2 strokes within a range in which the tank-side discharge passage 8 opposes the recess 2a, the cylinder device C2 enters a dead zone in which it does not exert a damping force with the above-mentioned range as a thrust reducing stroke range. Further, when the piston 2 strokes beyond the above-mentioned stroke range, if this stroke is in a direction away from the neutral position, the cylinder device C2 exerts a damping force against this stroke in a direction to return the piston 2 back to the neutral position. If the stroke is in a direction in which the piston 2 is returning back to the neutral position, the cylinder device C2 does not exert a damping force to hinder this stroke until the piston 2 returns to a position at which the tank-side discharge passage 8 is blocked.

Accordingly, the cylinder device C2 operates similar to the cylinder device C1 and achieves similar effects to those of the cylinder device C1, and thus the cylinder device C2 can improve the riding comfort in the railway vehicle.

In the cylinder device C2 as well, the following can be selected as in the cylinder device C1: elimination of the opening and closing valve 17, installation and non-installation of the throttle valve 8a, and installation and non-installation of the relief valve 8b. Further, the relief valves 21a, 10a, and 8b can be configured to generate a damping force, and thus these relief valves can be changed to a damping valve or throttle valve which has no valve-opening pressure setting.

Third Embodiment

Figure 6:
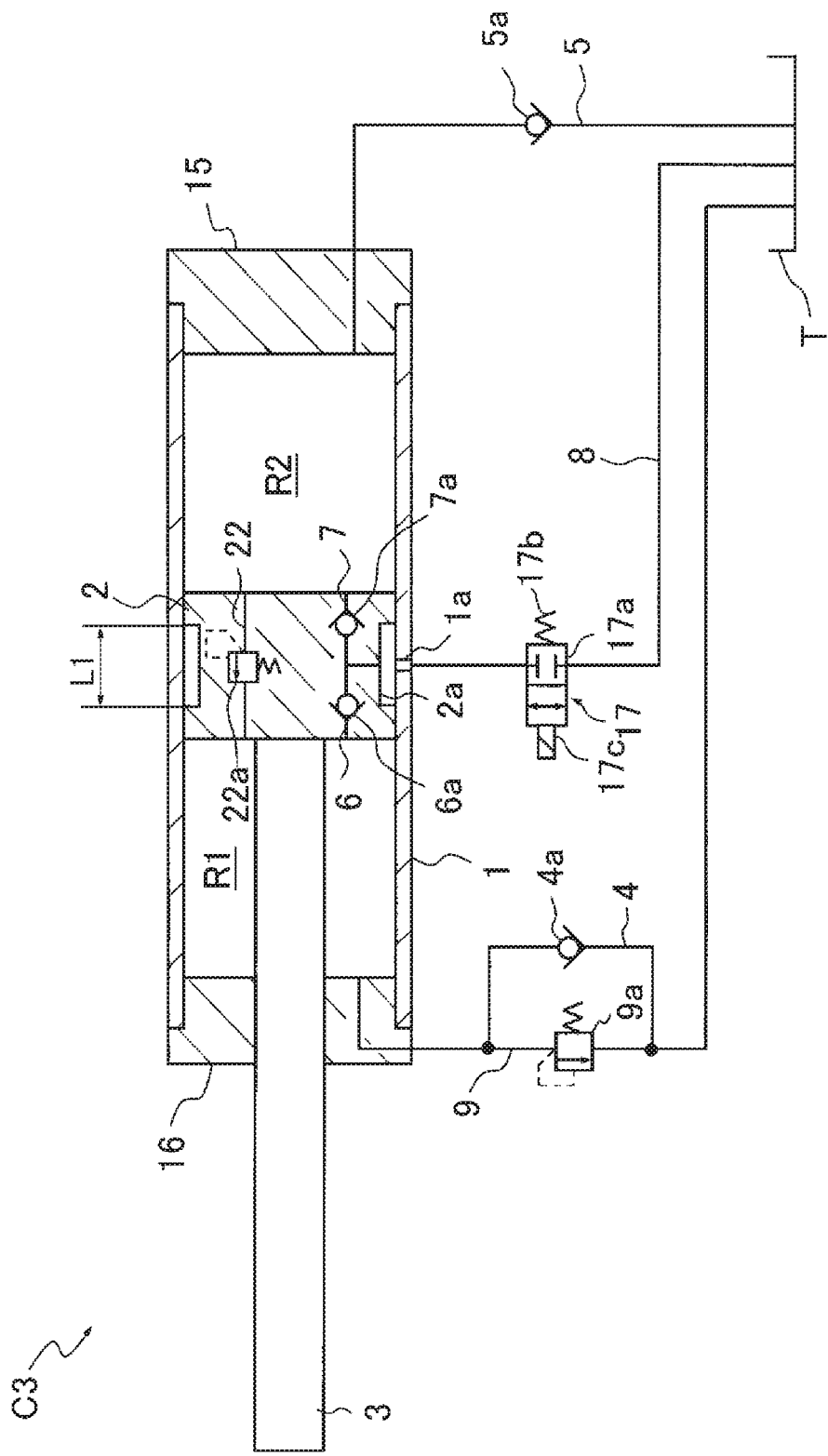
FIG. 6 is a schematic view of a cylinder device according to a third embodiment.

Next, a cylinder device C3 according to a third embodiment will be explained. As shown in FIG. 6, the cylinder device C3 includes the following: a cylinder 1; a piston 2 that is slidably inserted into the cylinder 1; a rod 3 that is inserted into the cylinder 1 and connected to the piston 2; an extension-side chamber R1 and a compression-side chamber R2 that are partitioned by the piston 2 within the cylinder 1; a tank T; an extension-side suction passage 4 that permits only the passage of liquid from the tank T toward the extension-side chamber R1; a compression-side suction passage 5 that permits only the passage of liquid from the tank T toward the compression-side chamber R2; a recess 2a that is provided on the outer periphery of the piston 2 and faces the cylinder 1; an extension-side discharge passage 6 that is provided in the piston 2 and permits only the flow of liquid from the extension-side chamber R1 toward the recess 2a; a compression-side discharge passage 7 that is provided in the piston 2 and permits only the flow of liquid from the compression-side chamber R2 toward the recess 2a; a tank-side discharge passage 8 that opens to the cylinder 1 and allows the extension-side discharge passage 6 and the compression-side discharge passage 7 to communicate with the tank T via the recess 2a; an extension-side damping passage 9 which serves as an extension-side damping force generation passage that applies a resistance to the flow of liquid from the extension-side chamber R1 toward the tank T; and a compression-side communication passage 22 which serves as a compression-side damping force generation passage that applies a resistance to the flow of liquid from the compression-side chamber R2 toward the extension-side chamber R1. In this way, the cylinder device C3 has the same constitution as the cylinder device C1 of the first embodiment, except that the compression-side damping passage 10 of the constitution of the cylinder device C1 is eliminated and replaced with the compression-side communication passage 22.

The compression-side communication passage 22 allows the compression-side chamber R2 to communicate with the extension-side chamber R1, and a relief valve 22a is provided in the compression-side communication passage 22. The relief valve 22a is a passive damping valve which opens the compression-side communication passage 22 when a valve-opening pressure is reached. Thereby, the relief valve 22a applies a resistance to the flow of liquid therethrough while permitting only the flow of liquid from the compression-side chamber R2 toward the extension-side chamber R1.

Next, the operation of the cylinder device C3 will be explained. First, a case in which the opening and closing valve 17 shuts off the tank-side discharge passage 8 will be explained. In this case, when the piston 2 moves relative to the cylinder 1 to the left direction in FIG. 6, or in other words when the cylinder device C3 extends, the extension-side chamber R1 is compressed, and resistance is applied by the relief valve 9a to the flow of liquid from the extension-side chamber R1 to the tank T via the extension-side damping passage 9. Thus, the pressure within the extension-side chamber R1 rises in accordance with the pressure loss of the relief valve 9a. On the other hand, liquid from the tank T is supplied via the compression-side suction passage 5 to the compression-side chamber R2 which is expanded, and thus the pressure within the compression-side chamber R2 becomes the tank pressure. Thereby, the pressure of the extension-side chamber R1 increases higher than the pressure of the compression-side chamber R2, and the cylinder device C3 exerts a damping force in a direction to suppress the extension in a size corresponding to the difference between the pressure of the extension-side chamber R1 and the pressure of the compression-side chamber R2. In contrast, when the piston 2 moves relative to the cylinder 1 to the right direction in FIG. 6, or in other words when the cylinder device C3 contracts, the compression-side chamber R2 is compressed, and resistance is applied by the relief valve 22a to the flow of liquid from the compression-side chamber R2 toward the extension-side chamber R1 via the compression-side communication passage 22. Thus, the pressure within the compression-side chamber R2 rises in accordance with the pressure loss of the relief valve 22a. On the other hand, the check valve 4a in the extension-side suction passage 4 opens and liquid from the tank T is supplied to the extension-side chamber R1 which is expanded, and thus the pressure within the extension-side chamber R1 becomes the tank pressure. Thereby, the pressure of the compression-side chamber R2 increases higher than the pressure of the extension-side chamber R1, and the cylinder device C3 exerts a damping force in a direction to suppress the contraction in a size corresponding to the difference between the pressure of the compression-side chamber R2 and the pressure of the extension-side chamber R1. Accordingly, in the case that the opening and closing valve 17 shuts off the tank-side discharge passage 8, similar to a general damper, the cylinder device C3 exerts a damping force during the stroke in both the extension operation and the contraction operation.

Next, a case in which the opening and closing valve 17 enables the tank-side discharge passage 8 to communicate will be explained. When the piston 2 strokes in a range within a distance L1/2 from the neutral position relative to the cylinder 1, the port 1a of the tank-side discharge passage 8 is in constant communication with the recess 2a. If the piston 2 strokes to the left within this range, liquid is discharged from the extension-side chamber R1 which is compressed to the tank T via the extension-side discharge passage 6, the recess 2a, and the tank-side discharge passage 8, and thus the extension-side chamber R1 is maintained at the tank pressure. Liquid is also supplied from the tank T via the compression-side suction passage 5 to the compression-side chamber R2 which is expanded, and thus the compression-side chamber R2 is also maintained at the tank pressure. At this time, since there is almost no pressure difference between the extension-side chamber R1 and the tank T, the extension-side damping passage 9 is in a blocked state. Conversely, when the piston 2 strokes to the right in a range within a distance L1/2 from the neutral position, liquid is discharged from the compression-side chamber R2 which is compressed to the tank T via the compression-side discharge passage 7, the recess 2a, and the tank-side discharge passage 8, and thus the compression-side chamber R2 is maintained at the tank pressure. Liquid is also supplied from the tank T via the extension-side suction passage 4 to the extension-side chamber R1 which is expanded, and thus the extension-side chamber R1 is also maintained at the tank pressure. At this time, since there is almost no pressure difference between the compression-side chamber R2 and the extension-side chamber R1, the compression-side communication passage 22 is in a blocked state. Therefore, in the case that the piston 2 strokes in a range within a distance L1/2 from the neutral position relative to the cylinder 1 and the port 1a of the tank-side discharge passage 8 is constantly maintained in a state of communication with the recess 2a, the cylinder device C3 enters a state in which it exerts almost no damping force against the oscillation input. Therefore, similar to the cylinder device C1, a thrust reducing stroke range is also provided in the cylinder device C3 in which the cylinder device C3 exerts almost no damping force due to the communication between the recess 2a and the port 1a. This thrust reducing stroke range is set by the axial direction width of the recess 2a.

In contrast, in the case that the piston 2 strokes beyond the range within a distance L1/2 from the neutral position relative to the cylinder 1 such that the port 1a of the tank-side discharge passage 8 is blocked by the piston 2, the cylinder device C3 enters a state which is identical to the state when the opening and closing valve 17 is closed. Thus, the cylinder device C3 exerts a damping force against the extension and contraction. Further, since the port 1a is gradually closed when the displacement of the piston 2 proceeds, the cylinder device C3 gradually increases the damping force until the port 1a is completely blocked by the displacement of the piston 2.

Accordingly, in a range in which the center pin P abuts the stopper S and the piston 2 blocks the port 1a, the cylinder device C3 exerts a damping force, and this exerted damping force suppresses the center pin P from separating from the stroke center. In this way, the cylinder device C3 can exert a damping force depending on the position of the vehicle body B relative to the carriage W without providing a stroke sensor. When the center pin P collides with the stopper S, the cylinder device C3 exerts a damping force to gradually suppress the displacement of the vehicle body B relative to the carriage W, and thus uncomfortable oscillations are not imparted to the vehicle body B at the stroke end and a good riding comfort can be ensured. Further, the cylinder device C3 does not exert a force to suppress displacement of the vehicle body B relative to the carriage W until the center pin P abuts the stopper S. Therefore, in the range in which the center pin P does not abut the stopper S, the cylinder device C3 does not exert a damping force which counteracts a control force for suppressing oscillation of the vehicle body B that is exerted by the actuator A, which is provided in combination with the cylinder device C3, while the actuator A is exerting this control force. Thus, the energy consumption of the actuator A can be reduced without harming the riding comfort in the railway vehicle.

When the piston 2 is located more toward the left side in FIG. 6 from the port 1a of the tank-side discharge passage 8 and the piston 2 strokes in a direction to compress the extension-side chamber R1, i.e. the left direction in FIG. 6, the extension-side chamber R1 is compressed and resistance is applied by the relief valve 9a to the flow of liquid discharged from the extension-side chamber R1 to the tank T via the extension-side damping passage 9, and liquid is supplied from the tank T to the compression-side chamber R2 which is expanded via the tank-side discharge passage 8 and the compression-side suction passage 5. Therefore, the cylinder device C3 exerts a damping force to counteract the extension. In contrast, when the piston 2 is located more toward the left side in FIG. 6 from the port 1a of the tank-side discharge passage 8 and the piston 2 strokes in a direction to compress the compression-side chamber R2, i.e. the right direction in FIG. 6, the compression-side chamber R2 communicates with the tank T via the tank-side discharge passage 8, and thus liquid is discharged from the compression-side chamber R2 which is compressed to the tank T via the tank-side discharge passage 8. Therefore, the pressure within the compression-side chamber R2 becomes the tank pressure. Liquid is also supplied from the tank T via the extension-side suction passage 4 to the extension-side chamber R1 that is expanded, and thus the inside of the extension-side chamber R1 also becomes the tank pressure. Accordingly, a difference cannot be generated between the pressure of the extension-side chamber R1 and the pressure of the compression-side chamber R2, and the cylinder device C3 exerts almost no damping force. This state is maintained until the piston 2 opposes the port 1a to block the tank-side discharge passage 8, and thus the cylinder device C3 does not exert a damping force until the piston 2 strokes in a direction to compress the compression-side chamber R2 from a state in which the piston 2 is located more toward the left side in FIG. 6 from the port 1a of the tank-side discharge passage 8 so that the piston 2 blocks the tank-side discharge passage 8.

When the piston 2 is located more toward the right side in FIG. 6 from the port 1a of the tank-side discharge passage 8 and the piston 2 strokes in a direction to compress the compression-side chamber R2, i.e. the right direction in FIG. 6, the compression-side chamber R2 is compressed and resistance is applied by the relief valve 22a to the flow of liquid discharged from the compression-side chamber R2 to the extension-side chamber R1 via the compression-side communication passage 22, and liquid is supplied from the tank T to the extension-side chamber R1 which is expanded via the tank-side discharge passage 8 and the extension-side suction passage 4. Therefore, the cylinder device C3 exerts a damping force to counteract the contraction. In contrast, when the piston 2 is located more toward the right side in FIG. 6 from the port 1a of the tank-side discharge passage 8 and the piston 2 strokes in a direction to compress the extension-side chamber R1, i.e. the left direction in FIG. 6, the extension-side chamber R1 communicates with the tank T via the tank-side discharge passage 8, and thus liquid is discharged from the extension-side chamber R1 which is compressed to the tank T via the tank-side discharge passage 8. Therefore, the pressure within the extension-side chamber R1 becomes the tank pressure. Liquid is also supplied from the tank T via the compression-side suction passage 5 to the compression-side chamber R2 that is expanded, and thus the inside of the compression-side chamber R2 also becomes the tank pressure. Accordingly, a difference cannot be generated between the pressure of the extension-side chamber R1 and the pressure of the compression-side chamber R2, and the cylinder device C3 exerts almost no damping force. This state is maintained until the piston 2 opposes the port 1a to block the tank-side discharge passage 8, and thus the cylinder device C3 does not exert a damping force until the piston 2 strokes in a direction to compress the extension-side chamber R1 from a state in which the piston 2 is located more toward the right side in FIG. 6 from the port 1a of the tank-side discharge passage 8 so that the piston 2 blocks the tank-side discharge passage 8.

In this way, when the cylinder device C3 strokes within a range in which the tank-side discharge passage 8 opposes the recess 2a, the cylinder device C3 enters a dead zone in which it does not exert a damping force with the above-mentioned range as a thrust reducing stroke range. Further, when the piston 2 strokes beyond the above-mentioned stroke range, if this stroke is in a direction away from the neutral position, the cylinder device C3 exerts a damping force against this stroke in a direction to return the piston 2 back to the neutral position. If the stroke is in a direction in which the piston 2 is returning back to the neutral position, the cylinder device C3 does not exert a damping force to hinder this stroke until the piston 2 returns to a position at which the tank-side discharge passage 8 is blocked.

Accordingly, the cylinder device C3 operates similar to the cylinder device C1 and achieves similar effects to those of the cylinder device C1, and thus the cylinder device C3 can improve the riding comfort in the railway vehicle.

In the cylinder device C3 as well, the following can be selected as in the cylinder device C1: elimination of the opening and closing valve 17, installation and non-installation of the throttle valve 8a, and installation and non-installation of the relief valve 8b. Further, the relief valves 9a, 22a, and 8b can be configured to generate a damping force, and thus these relief valves can be changed to a damping valve or throttle valve which has no valve-opening pressure setting.

Fourth Embodiment

Figure 7:
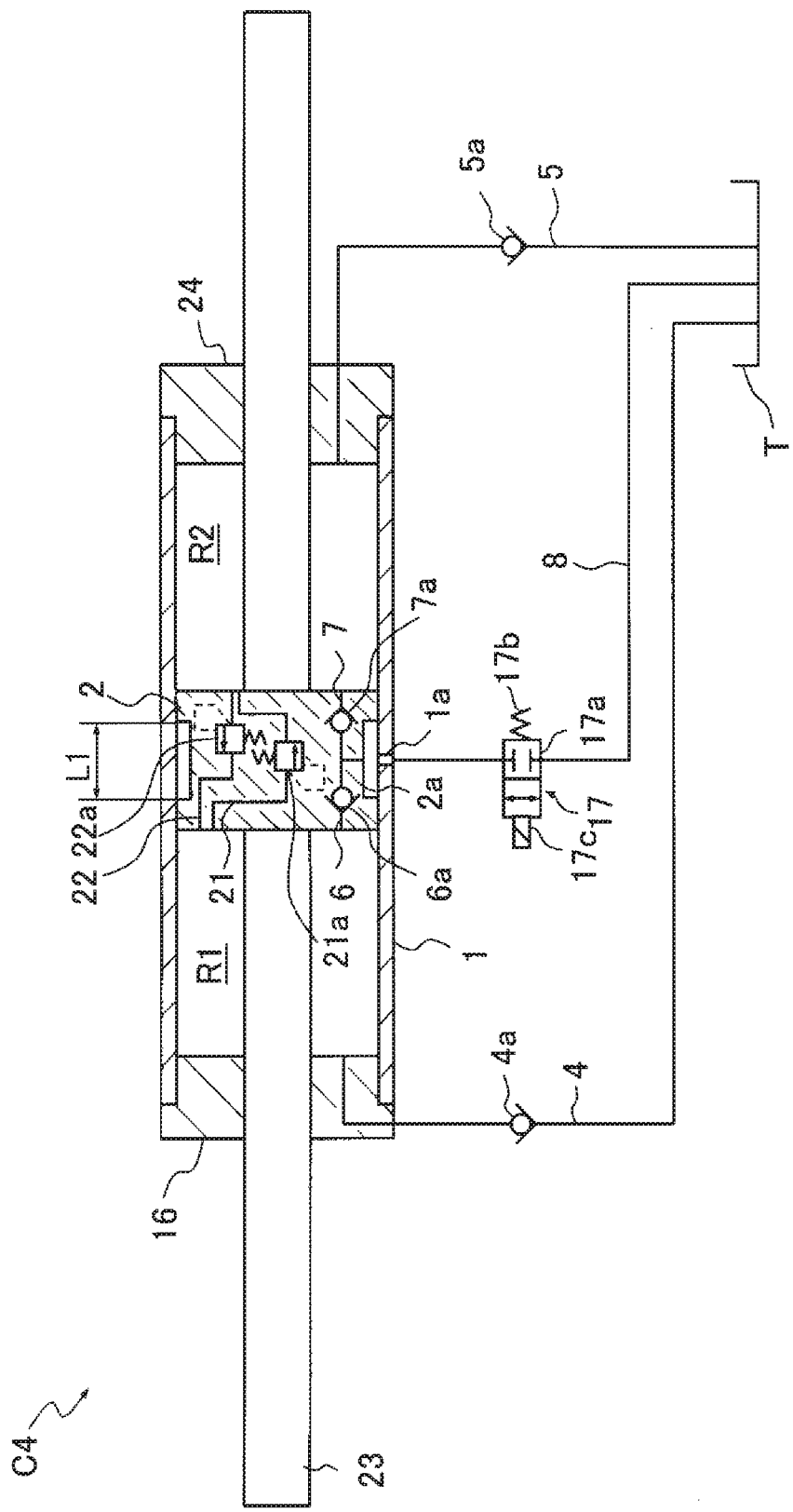
FIG. 7 is a schematic view of a cylinder device according to a fourth embodiment.

Next, a cylinder device C4 according to a fourth embodiment will be explained. As shown in FIG. 7, the cylinder device C4 includes the following: a cylinder 1; a piston 2 that is slidably inserted into the cylinder 1; a rod 23 that is inserted into the cylinder 1, both ends of the rod 23 protruding to the outside from the cylinder 1 and the piston 2 being connected to the center of the rod 23; an extension-side chamber R1 and a compression-side chamber R2 that are partitioned by the piston 2 within the cylinder 1; a tank T; an extension-side suction passage 4 that permits only the passage of liquid from the tank T toward the extension-side chamber R1; a compression-side suction passage 5 that permits only the passage of liquid from the tank T toward the compression-side chamber R2; a recess 2a that is provided on the outer periphery of the piston 2 and faces the cylinder 1; an extension-side discharge passage 6 that is provided in the piston 2 and permits only the flow of liquid from the extension-side chamber R1 toward the recess 2a; a compression-side discharge passage 7 that is provided in the piston 2 and permits only the flow of liquid from the compression-side chamber R2 toward the recess 2a; a tank-side discharge passage 8 that opens to the cylinder 1 and allows the extension-side discharge passage 6 and the compression-side discharge passage 7 to communicate with the tank T via the recess 2a; an extension-side communication passage 21 which serves as an extension-side damping force generation passage that applies a resistance to the flow of liquid from the extension-side chamber R1 toward the compression-side chamber R2; and a compression-side communication passage 22 which serves as a compression-side damping force generation passage that applies a resistance to the flow of liquid from the compression-side chamber R2 toward the extension-side chamber R1. In this way, in the cylinder device C4, the extension-side damping passage 9 and the compression-side damping passage 10 are eliminated from the constitution of the cylinder device C1 in the first embodiment and replaced with the extension-side communication passage 21 and the compression-side communication passage 22, and the rod 23 is configured in a double rod manner such that both ends of the rod 23 protrude to the outside from both sides of the cylinder 1.

In the cylinder device C4, since the rod 23 protrudes to the outside from both sides of the cylinder 1, an annular rod guide 24 is mounted on the right end of the cylinder 1 instead of the lid 15. The rod 23 is inserted into the rod guide 24 such that the right end of the rod 23 protrudes to the outside of the cylinder 1. In this way, the cylinder device C4 is of the double-rod type, and thus the displacement volume of the rod 23 within the cylinder 1 does not change even if the rod 23 moves to the left and right within the cylinder 1. Therefore, exchange of liquid for volume compensation between the cylinder 1 and the tank T is not necessary. However, volume changes of the liquid do occur due to temperature changes, and thus a passage for temperature compensation, which allows the tank T to communicate with the extension-side chamber R1 or the compression-side chamber R2 and includes an orifice of an extremely small diameter, should be provided. The piston 2 is provided in the center of the rod 23, but the installation position of the piston 2 is not limited to the center as long as both ends of the rod 23 protrude to the outside from both sides of the cylinder 1 over the entire stroke range.

As explained above with regard to the cylinder device C2 of the second embodiment, the extension-side communication passage 21 includes a relief valve 21a, and applies a resistance to the flow of liquid therethrough while permitting only the flow of liquid from the extension-side chamber R1 toward the compression-side chamber R2.

As explained above with regard to the cylinder device C3 of the third embodiment, the compression-side communication passage 22 includes a relief valve 22a, and applies a resistance to the flow of liquid therethrough while permitting only the flow of liquid from the compression-side chamber R2 toward the extension-side chamber R1.

Next, the operation of the cylinder device C4 will be explained. First, a case in which the opening and closing valve 17 shuts off the tank-side discharge passage 8 will be explained. In this case, when the piston 2 moves relative to the cylinder 1 to the left direction in FIG. 7, or in other words when the cylinder device C4 extends, the extension-side chamber R1 is compressed, and a resistance is applied by the relief valve 21a to the flow of liquid from the extension-side chamber R1 to the compression-side chamber R2 via the extension-side communication passage 21. Thus, the pressure within the extension-side chamber R1 rises in accordance with the pressure loss of the relief valve 21a. On the other hand, liquid from the extension-side chamber R1 flows into the compression-side chamber R2 which is expanded via the extension-side communication passage 21. Therefore, the pressure of the extension-side chamber R1 increases higher than the pressure of the compression-side chamber R2, and the cylinder device C4 exerts a damping force in a direction to suppress the extension in a size corresponding to the difference between the pressure of the extension-side chamber R1 and the pressure of the compression-side chamber R2. In contrast, when the piston 2 moves relative to the cylinder 1 to the right direction in FIG. 7, or in other words when the cylinder device C4 contracts, the compression-side chamber R2 is compressed, and resistance is applied by the relief valve 22a to the flow of liquid from the compression-side chamber R2 toward the extension-side chamber R1 via the compression-side communication passage 22. Thus, the pressure within the compression-side chamber R2 rises in accordance with the pressure loss of the relief valve 22a. Liquid is supplied to the extension-side chamber R1 which is expanded via the compression-side communication passage 22. Therefore, the pressure of the compression-side chamber R2 increases higher than the pressure of the extension-side chamber R1, and the cylinder device C4 exerts a damping force in a direction to suppress the contraction in a size corresponding to the difference between the pressure of the compression-side chamber R2 and the pressure of the extension-side chamber R1. Accordingly, in the case that the opening and closing valve 17 shuts off the tank-side discharge passage 8, similar to a general damper, the cylinder device C4 exerts a damping force during the stroke in both the extension operation and the contraction operation.

Next, a case in which the opening and closing valve 17 enables the tank-side discharge passage 8 to communicate will be explained. When the piston 2 strokes in a range within a distance L1/2 from the neutral position relative to the cylinder 1, the port 1a of the tank-side discharge passage 8 is in constant communication with the recess 2a. If the piston 2 strokes to the left within this range, liquid is discharged from the extension-side chamber R1 which is compressed to the tank T via the extension-side discharge passage 6, the recess 2a, and the tank-side discharge passage 8, and thus the extension-side chamber R1 is maintained at the tank pressure. Liquid is also supplied from the tank T via the compression-side suction passage 5 to the compression-side chamber R2 which is expanded, and thus the compression-side chamber R2 is also maintained at the tank pressure. Conversely, when the piston 2 strokes to the right in a range within a distance L1/2 from the neutral position, liquid is discharged from the compression-side chamber R2 which is compressed to the tank T via the compression-side discharge passage 7, the recess 2a, and the tank-side discharge passage 8, and thus the compression-side chamber R2 is maintained at the tank pressure. Liquid is also supplied from the tank T via the extension-side suction passage 4 to the extension-side chamber R1 which is expanded, and thus the extension-side chamber R1 is also maintained at the tank pressure. Therefore, in the case that the piston 2 strokes in a range within a distance L1/2 from the neutral position relative to the cylinder 1 and the port 1a of the tank-side discharge passage 8 is constantly maintained in a state of communication with the recess 2a, the cylinder device C4 enters a state in which it exerts almost no damping force against the oscillation input. In this way, when the cylinder device C4 strokes in a range within a distance L1/2 from the neutral position, almost no pressure differential is generated between the extension-side chamber R1 and the compression-side chamber R2, and thus the extension-side communication passage 21 and the compression-side communication passage 22 are in a closed state. Therefore, similar to the cylinder device C1, a thrust reducing stroke range is also provided in the cylinder device C4 in which the cylinder device C4 exerts almost no damping force due to the communication between the recess 2a and the port 1a. This thrust reducing stroke range is set by the axial direction width of the recess 2a.

In contrast, in the case that the piston 2 strokes beyond the range within a distance L1/2 from the neutral position relative to the cylinder 1 such that the port 1a of the tank-side discharge passage 8 is blocked by the piston 2, the cylinder device C4 enters a state which is identical to the state when the opening and closing valve 17 is closed. Thus, the cylinder device C4 exerts a damping force against the extension and contraction. Further, since the port 1a is gradually closed when the displacement of the piston 2 proceeds, the cylinder device C4 gradually increases the damping force until the port 1a is completely blocked by the displacement of the piston 2.

Accordingly, in a range in which the center pin P abuts the stopper S and the piston 2 blocks the port 1a, the cylinder device C4 exerts a damping force, and this exerted damping force suppresses the center pin P from separating from the stroke center. In this way, the cylinder device C4 can exert a damping force depending on the position of the vehicle body B relative to the carriage W without providing a stroke sensor. When the center pin P collides with the stopper S, the cylinder device C4 exerts a damping force to gradually suppress the displacement of the vehicle body B relative to the carriage W, and thus uncomfortable oscillations are not imparted to the vehicle body B at the stroke end and a good riding comfort can be ensured. Further, the cylinder device C4 does not exert a force to suppress displacement of the vehicle body B relative to the carriage W until the center pin P abuts the stopper S. Therefore, in the range in which the center pin P does not abut the stopper S, the cylinder device C4 does not exert a damping force which counteracts a control force for suppressing oscillation of the vehicle body B that is exerted by the actuator A, which is provided in combination with the cylinder device C4, while the actuator A is exerting this control force. Thus, the energy consumption of the actuator A can be reduced without harming the riding comfort in the railway vehicle.

When the piston 2 is located more toward the left side in FIG. 7 from the port 1a of the tank-side discharge passage 8 and the piston 2 strokes in a direction to compress the extension-side chamber R1, i.e. the left direction in FIG. 7, the extension-side chamber R1 is compressed and resistance is applied by the relief valve 21a to the flow of liquid discharged from the extension-side chamber R1 to the compression-side chamber R2 via the extension-side communication passage 21, and liquid is supplied from the extension-side chamber R1 to the compression-side chamber R2 which is expanded. Thus, the pressure of the extension-side chamber R1 becomes greater than the pressure of the compression-side chamber R2, and the cylinder device C4 exerts a damping force to counteract the extension. In contrast, when the piston 2 is located more toward the left side in FIG. 7 from the port 1a of the tank-side discharge passage 8 and the piston 2 strokes in a direction to compress the compression-side chamber R2, i.e. the right direction in FIG. 7, the compression-side chamber R2 communicates with the tank T via the tank-side discharge passage 8, and thus liquid is discharged from the compression-side chamber R2 which is compressed to the tank T via the tank-side discharge passage 8. Therefore, the pressure within the compression-side chamber R2 becomes the tank pressure. Liquid is also supplied from the tank T via the extension-side suction passage 4 to the extension-side chamber R1 that is expanded, and thus the inside of the extension-side chamber R1 also becomes the tank pressure. Accordingly, a difference cannot be generated between the pressure of the extension-side chamber R1 and the pressure of the compression-side chamber R2, and the cylinder device C4 exerts almost no damping force. This state is maintained until the piston 2 opposes the port 1a to block the tank-side discharge passage 8, and thus the cylinder device C4 does not exert a damping force until the piston 2 strokes in a direction to compress the compression-side chamber R2 from a state in which the piston 2 is located more toward the left side in FIG. 7 from the port 1a of the tank-side discharge passage 8 so that the piston 2 blocks the tank-side discharge passage 8.

When the piston 2 is located more toward the right side in FIG. 7 from the port 1a of the tank-side discharge passage 8 and the piston 2 strokes in a direction to compress the compression-side chamber R2, i.e. the right direction in FIG. 7, the compression-side chamber R2 is compressed and resistance is applied by the relief valve 22a to the flow of liquid discharged from the compression-side chamber R2 to the extension-side chamber R1 via the compression-side communication passage 22, and liquid is supplied from the compression-side chamber R2 to the extension-side chamber R1 which is expanded. Thus, the pressure of the compression-side chamber R2 becomes greater than the pressure of the extension-side chamber R1, and the cylinder device C4 exerts a damping force to counteract the contraction. In contrast, when the piston 2 is located more toward the right side in FIG. 7 from the port 1a of the tank-side discharge passage 8 and the piston 2 strokes in a direction to compress the extension-side chamber R1, i.e. the left direction in FIG. 7, the extension-side chamber R1 communicates with the tank T via the tank-side discharge passage 8, and thus liquid is discharged from the extension-side chamber R1 which is compressed to the tank T via the tank-side discharge passage 8. Therefore, the pressure within the extension-side chamber R1 becomes the tank pressure. Liquid is also supplied from the tank T via the compression-side suction passage 5 to the compression-side chamber R2 that is expanded, and thus the inside of the compression-side chamber R2 also becomes the tank pressure. Accordingly, a difference cannot be generated between the pressure of the extension-side chamber R1 and the pressure of the compression-side chamber R2, and the cylinder device C4 exerts almost no damping force. This state is maintained until the piston 2 opposes the port 1a to block the tank-side discharge passage 8, and thus the cylinder device C4 does not exert a damping force until the piston 2 strokes in a direction to compress the extension-side chamber R1 from a state in which the piston 2 is located more toward the right side in FIG. 7 from the port 1a of the tank-side discharge passage 8 so that the piston 2 blocks the tank-side discharge passage 8.

In this way, when the cylinder device C4 strokes within a range in which the tank-side discharge passage 8 opposes the recess 2a, the cylinder device C4 enters a dead zone in which it does not exert a damping force with the above-mentioned range as a thrust reducing stroke range. Further, when the piston 2 strokes beyond the above-mentioned stroke range, if this stroke is in a direction away from the neutral position, the cylinder device C4 exerts a damping force against this stroke in a direction to return the piston 2 back to the neutral position. If the stroke is in a direction in which the piston 2 is returning back to the neutral position, the cylinder device C4 does not exert a damping force to hinder this stroke until the piston 2 returns to a position at which the tank-side discharge passage 8 is blocked.

Accordingly, the cylinder device C4 operates similar to the cylinder device C1 and achieves similar effects to those of the cylinder device C1, and thus the cylinder device C4 can improve the riding comfort in the railway vehicle.

In the cylinder device C4 as well, the following can be selected as in the cylinder device C1: elimination of the opening and closing valve 17, installation and non-installation of the throttle valve 8a, and installation and non-installation of the relief valve 8b. Further, the relief valves 21a, 22a, and 8b can be configured to generate a damping force, and thus these relief valves can be changed to a damping valve or throttle valve which has no valve-opening pressure setting.

In the cylinder device C1, only the extension-side damping passage 9 and the compression-side damping passage 10 are provided, but either one or both of the extension-side communication passage 21 and the compression-side communication passage 22 can be provided to the constitution of the cylinder device C1. In such a constitution, either one of the extension-side damping passage 9 and the extension-side communication passage 21, which exert a damping force during the course of extension, can be configured to function as a relief passage that releases pressure so that the pressure within the extension-side chamber R1 does not exceed a permitted pressure, and thereby the system can be protected. Similarly, on the compression side, either one of the compression-side damping passage 10 and the compression-side communication passage 22, which exert a damping force during the course of contraction, can be configured to function as a relief passage that releases pressure so that the pressure within the compression-side chamber R2 does not exceed a permitted pressure, and thereby the system can be protected.

In addition, in the cylinder device C2, only the extension-side communication passage 21 and the compression-side damping passage 10 are provided, but the compression-side communication passage 22 can be provided to the constitution of the cylinder device C2. In the cylinder device C3, only the extension-side damping passage 9 and the compression-side communication passage 22 are provided, but the extension-side communication passage 21 can be provided to the constitution of the cylinder device C3. In the cylinder device C4, only the extension-side communication passage 21 and the compression-side communication passage 22 are provided, but either one or both of the extension-side damping passage 9 and the compression-side damping passage 10 can be provided to the constitution of the cylinder device C4. With such constitutions, the systems of the cylinder devices C2, C3, and C4 can be protected from excessive pressure within the cylinder 1.

Fifth Embodiment

Figure 8:
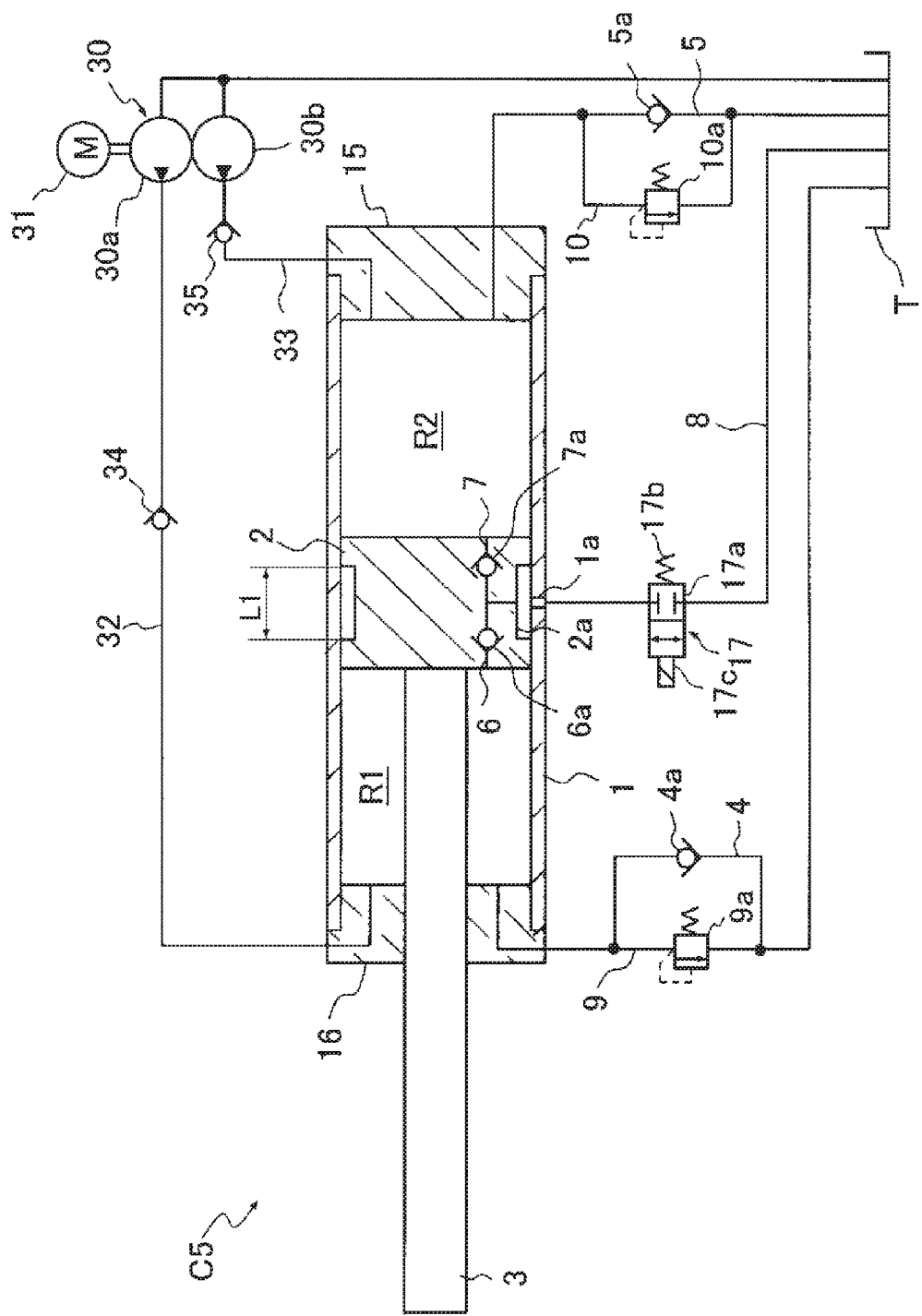
FIG. 8 is a schematic view of a cylinder device according to a fifth embodiment.

Next, a cylinder device C5 according to a fifth embodiment will be explained. As shown in FIG. 8, the cylinder device C5 includes the following: a cylinder 1; a piston 2 that is slidably inserted into the cylinder 1; a rod 3 that is inserted into the cylinder 1 and connected to the piston 2; an extension-side chamber R1 and a compression-side chamber R2 that are partitioned by the piston 2 within the cylinder 1; a tank T; an extension-side suction passage 4 that permits only the passage of liquid from the tank T toward the extension-side chamber R1; a compression-side suction passage 5 that permits only the passage of liquid from the tank T toward the compression-side chamber R2; a recess 2a that is provided on the outer periphery of the piston 2 and faces the cylinder 1; an extension-side discharge passage 6 that is provided in the piston 2 and permits only the flow of liquid from the extension-side chamber R1 toward the recess 2a; a compression-side discharge passage 7 that is provided in the piston 2 and permits only the flow of liquid from the compression-side chamber R2 toward the recess 2a; a tank-side discharge passage 8 that opens to the cylinder 1 and allows the extension-side discharge passage 6 and the compression-side discharge passage 7 to communicate with the tank T via the recess 2a; an extension-side damping passage 9 which serves as an extension-side damping force generation passage that applies a resistance to the flow of liquid from the extension-side chamber R1 toward the tank T; a compression-side damping passage 10 which serves as a compression-side damping force generation passage that applies a resistance to the flow of liquid from the compression-side chamber R2 toward the tank T; and a tandem pump 30 that supplies a liquid at the same flow rate to both the extension-side chamber R1 and the compression-side chamber R2. The cylinder device C5 has the same constitution as the cylinder device C1 of the first embodiment, except that the tandem pump 30 is added to the constitution of the cylinder device C1.

The tandem pump 30 is driven by a motor 31. The tandem pump 30 has two pumps 30a and 30b which share a drive shaft driven by the motor 31, and suction liquid from the tank T and discharge the liquid at the same discharge rate.

One of the pumps, the pump 30a, is connected to a supply passage 32 which opens at a discharge port at the rod guide 16 and communicates with the extension-side chamber R1. When the pump 30a is driven by the motor 31, the pump 30a suctions liquid from the tank T and supplies the liquid to the extension-side chamber R1. The other pump, the pump 30b, is connected to a supply passage 33 which opens at a discharge port at the lid 15 and communicates with the compression-side chamber R2. When the pump 30b is driven by the motor 31, the pump 30b suctions liquid from the tank T and supplies the liquid to the compression-side chamber R2. The pumps 30a and 30b are driven by a single motor 31, and discharge liquid at mutually identical discharge rates. In other words, the tandem pump 30 supplies liquid in equivalent amounts to the extension-side chamber R1 and the compression-side chamber R2.

Check valves 34 and 35, which inhibit the backflow of liquid from the extension-side chamber R1 and the compression-side chamber R2 to the pump 30a and the pump 30b, are provided in the supply passages 32 and 33.

Next, the operation of the cylinder device C5 will be explained. First, a case in which the opening and closing valve 17 shuts off the tank-side discharge passage 8 will be explained. In the case that the tandem pump 30 is operating, when the piston 2 moves relative to the cylinder 1 to the left direction in FIG. 8, or in other words when the cylinder device C5 extends, the extension-side chamber R1 is compressed and the compression-side chamber R2 is expanded. However, the flow amount of the liquid supplied to both chambers is the same, and thus the pressure of the extension-side chamber R1 becomes greater than the pressure of the compression-side chamber R2. Therefore, the cylinder device C5 exerts a thrust to counteract the extension. In the case that the tandem pump 30 is operating, when the piston 2 moves relative to the cylinder 1 to the right direction in FIG. 8, or in other words when the cylinder device C5 contracts, the compression-side chamber R2 is compressed and the extension-side chamber R1 is expanded. However, the flow amount of the liquid supplied to both chambers is the same, and thus the pressure of the compression-side chamber R2 becomes greater than the pressure of the extension-side chamber R1. Therefore, the cylinder device C5 exerts a thrust to counteract the contraction.

On the other hand, in the cylinder device C5, the tandem pump 30 is added to the constitution of the cylinder device C1. Therefore, in a state in which the tandem pump 30 is not operating in the case that the opening and closing valve 17 shuts off the tank-side discharge passage 8, the cylinder device C5 operates similar to the cylinder device C1. Thus, similar to a general damper, the cylinder device C5 exerts a thrust during the stroke in both the extension operation and the contraction operation.

Next, a case in which the opening and closing valve 17 enables the tank-side discharge passage 8 to communicate and the tandem pump 30 is operating will be explained. When the piston 2 strokes in the thrust reducing stroke range within a distance L1/2 from the neutral position relative to the cylinder 1, the port 1a of the tank-side discharge passage 8 is in constant communication with the recess 2a. Even if liquid is supplied to the extension-side chamber R1 and the compression-side chamber R2 from the tandem pump 30, all of the liquid that is supplied via the extension-side discharge passage 6, the compression-side discharge passage 7, the recess 2a, and the tank-side discharge passage 8 is discharged from the extension-side chamber R1 and the compression-side chamber R2 to the tank T. Thus, the extension-side chamber R1 and the compression-side chamber R2 are maintained at the tank pressure. Therefore, even if the tandem pump 30 is operating, the cylinder device C5 does not exert a thrust in the extension direction or the contraction direction. Further, even if the piston 2 strokes to the left in the thrust reducing stroke range, all of the liquid that is supplied from the tandem pump 30 via the extension-side discharge passage 6, the compression-side discharge passage 7, the recess 2a, and the tank-side discharge passage 8 is discharged from the extension-side chamber R1 and the compression-side chamber R2 to the tank T. Thus, the extension-side chamber R1 and the compression-side chamber R2 are maintained at the tank pressure. Therefore, even if the tandem pump 30 is operating, the cylinder device C5 does not exert a thrust even during extension in the thrust reducing stroke range. Conversely, even if the piston 2 strokes to the right in the thrust reducing stroke range, all of the liquid that is supplied from the tandem pump 30 via the extension-side discharge passage 6, the compression-side discharge passage 7, the recess 2a, and the tank-side discharge passage 8 is discharged from the extension-side chamber R1 and the compression-side chamber R2 to the tank T. Thus, the extension-side chamber R1 and the compression-side chamber R2 are maintained at the tank pressure. Therefore, even if the tandem pump 30 is operating, the cylinder device C5 does not exert a thrust even during contraction in the thrust reducing stroke range.

On the other hand, in the cylinder device C5, the tandem pump 30 is added to the constitution of the cylinder device C1. Therefore, in a state in which the tandem pump 30 is not operating in the case that the opening and closing valve 17 enables the tank-side discharge passage 8 to communicate, the cylinder device C5 operates similar to the cylinder device C1 as long as it strokes in the thrust reducing stroke range. Thus, the cylinder device C5 does not exert a thrust in both the extension operation and the contraction operation.

In contrast, in the case that the piston 2 strokes beyond the range within a distance L1/2 from the neutral position relative to the cylinder 1 such that the port 1a of the tank-side discharge passage 8 is blocked by the piston 2, the cylinder device C5 enters a state which is identical to the state when the opening and closing valve 17 is closed. Thus, regardless of whether or not the tandem pump 30 is operating, the cylinder device C5 exerts a thrust to suppress the extension and contraction. Further, since the port 1a is gradually closed when the displacement of the piston 2 proceeds, the cylinder device C5 gradually increases the thrust which suppresses the extension and contraction until the port 1a is completely blocked by the displacement of the piston 2.

Accordingly, in a range in which the center pin P abuts the stopper S and the piston 2 blocks the port 1a, the cylinder device C5 exerts a thrust, and this exerted thrust suppresses the center pin P from separating from the stroke center. In this way, the cylinder device C5 can exert a thrust depending on the position of the vehicle body B relative to the carriage W without providing a stroke sensor. When the center pin P collides with the stopper S, the cylinder device C5 exerts a thrust to gradually suppress the displacement of the vehicle body B relative to the carriage W, and thus uncomfortable oscillations are not imparted to the vehicle body B at the stroke end and a good riding comfort can be ensured. Further, the cylinder device C5 does not exert a force to suppress displacement of the vehicle body B relative to the carriage W until the center pin P abuts the stopper S. Therefore, in the range in which the center pin P does not abut the stopper S, the cylinder device C5 does not exert a thrust which counteracts a control force for suppressing oscillation of the vehicle body B that is exerted by the actuator A, which is provided in combination with the cylinder device C5, while the actuator A is exerting this control force. Thus, the energy consumption of the actuator A can be reduced without harming the riding comfort in the railway vehicle.

In the case that the opening and closing valve 17 enables the tank-side discharge passage 8 to communicate and the tandem pump 30 is operating, if the piston 2 is located more toward the left side in FIG. 8 from the port 1a of the tank-side discharge passage 8, liquid from the inside of the extension-side chamber R1 is discharged to the tank T via the extension-side damping passage 9. However, liquid from the inside of the compression-side chamber R2 is discharged to the tank T via the compression-side discharge passage 7 and the tank-side discharge passage 8. Therefore, the pressure within the extension-side chamber R1 becomes greater than the pressure of the compression-side chamber R2, which is equal to the tank pressure. Thus, the cylinder device C5 constantly exerts a thrust in a direction to return the piston 2 back to the neutral position. In contrast, in the case that the opening and closing valve 17 enables the tank-side discharge passage 8 to communicate and the tandem pump 30 is operating, if the piston 2 is located more toward the right side in FIG. 8 from the port 1a of the tank-side discharge passage 8, liquid from the inside of the compression-side chamber R2 is discharged to the tank T via the compression-side damping passage 10. However, liquid from the inside of the extension-side chamber R1 is discharged to the tank T via the extension-side discharge passage 6 and the tank-side discharge passage 8. Therefore, the pressure within the compression-side chamber R2 becomes greater than the pressure of the extension-side chamber R1, which is equal to the tank pressure. Thus, the cylinder device C5 constantly exerts a thrust in a direction to return the piston 2 back to the neutral position.

In the case that the opening and closing valve 17 enables the tank-side discharge passage 8 to communicate and the tandem pump 30 is stopped, the cylinder device C5 operates similar to the cylinder device C1. In other words, when the piston 2 is located more toward the left side in FIG. 8 from the port 1a of the tank-side discharge passage 8 and the piston 2 strokes in a direction to compress the extension-side chamber R1, the cylinder device C5 exerts a thrust to counteract the extension, and when the piston 2 is located more toward the left side in FIG. 8 from the port 1a of the tank-side discharge passage 8 and the piston 2 strokes in a direction to compress the compression-side chamber R2, the cylinder device C5 exerts almost no thrust until the piston 2 blocks the tank-side discharge passage 8. Conversely, when the piston 2 is located more toward the right side in FIG. 8 from the port 1a of the tank-side discharge passage 8 and the piston 2 strokes in a direction to compress the compression-side chamber R2, the cylinder device C5 exerts a thrust to counteract the contraction, and when the piston 2 is located more toward the right side in FIG. 8 from the port 1a of the tank-side discharge passage 8 and the piston 2 strokes in a direction to compress the extension-side chamber R1, the cylinder device C5 exerts no thrust until the piston 2 blocks the tank-side discharge passage 8.

In this way, in the cylinder device C5 as well, regardless of whether the tandem pump 30 is operating or is stopped, when the cylinder device C5 strokes within a range in which the tank-side discharge passage 8 opposes the recess 2a, the cylinder device C5 enters a dead zone in which it does not exert a thrust with the above-mentioned range as a thrust reducing stroke range. Further, when the piston 2 strokes beyond the above-mentioned stroke range, if the tandem pump 30 is operating, the cylinder device C5 constantly exerts a thrust in a direction to return the piston 2 back to the neutral position. Thus, the vehicle body B can be quickly returned to the stroke center relative to the carriage W. Therefore, a situation in which the stopper S and the center pin P abut each other over a long period of time, which makes it difficult to suppress oscillations of the vehicle body B, can be avoided. If the tandem pump 30 is in a stopped state, similar to the cylinder device C1, if the piston 2 strokes in a direction away from the neutral position, the cylinder device C5 exerts a thrust against this stroke in a direction to return the piston 2 back to the neutral position, and if the piston 2 strokes in a direction to return back to the neutral position, the cylinder device C5 does not exert a thrust to hinder this stroke until the piston 2 returns to a position at which the tank-side discharge passage 8 is blocked.

Accordingly, not only does the cylinder device C5 operate as a passive damper that does not exert a thrust in a thrust reducing stroke range similar to the cylinder device C1, the cylinder device C5 can also exert a thrust to actively return the piston 2 back to the neutral position due to the addition of the tandem pump 30. Thus, the riding comfort in the railway vehicle can be further improved.

In the cylinder device C5 as well, the following can be selected as in the cylinder device C1: elimination of the opening and closing valve 17, installation and non-installation of the throttle valve 8a, and installation and non-installation of the relief valve 8b. Further, the relief valves 9a, 10a, and 8b can be configured to generate a damping force, and thus these relief valves can be changed to a damping valve or throttle valve which has no valve-opening pressure setting. In addition, the tandem pump 30 can be also implemented in the cylinder device C2 of the second embodiment, the cylinder device C3 of the third embodiment, and the cylinder device C4 of the fourth embodiment. If the tandem pump 30 is provided to the cylinder device C2, C3, or C4, the cylinder device can also exert a thrust to actively return the piston 2 to the neutral position, and thus the riding comfort in the railway vehicle can be further improved.

In the cylinder device C5, only the extension-side damping passage 9 and the compression-side damping passage 10 are provided, but either one or both of the extension-side communication passage 21 and the compression-side communication passage 22 can be provided to the constitution of the cylinder device C5. In such a constitution, either one of the extension-side damping passage 9 and the extension-side communication passage 21, which exert a damping force during the course of extension, can be configured to function as a relief passage that releases pressure so that the pressure within the extension-side chamber R1 does not exceed a permitted pressure, and thereby the system can be protected.

Similarly, on the compression side, either one of the compression-side damping passage 10 and the compression-side communication passage 22, which exert a damping force during the course of contraction, can be configured to function as a relief passage that releases pressure so that the pressure within the compression-side chamber R2 does not exceed a permitted pressure, and thereby the system can be protected.

In addition, even in the case that the tandem pump 30 is implemented in the cylinder device C2 so as to supply liquid to the extension-side chamber R1 and the compression-side chamber R2, the compression-side communication passage 22 can be provided to the constitution of the cylinder device C2. Even in the case that the tandem pump 30 is implemented in the cylinder device C3 so as to supply liquid to the extension-side chamber R1 and the compression-side chamber R2, the extension-side communication passage 21 can be provided to the constitution of the cylinder device C3. Further, even in the case that the tandem pump 30 is implemented in the cylinder device C4 so as to supply liquid to the extension-side chamber R1 and the compression-side chamber R2, either one or both of the extension-side damping passage 9 and the compression-side damping passage 10 can be provided to the constitution of the cylinder device C4. With such constitutions, the systems of the cylinder devices C2, C3, and C4 can be protected from excessive pressure within the cylinder 1.

The embodiments of the present invention described above are merely illustration of some application examples of the present invention and not of the nature to limit the technical scope of the present invention to the specific constructions of the above embodiments.

The present application claims a priority based on Japanese Patent Application No. 2014-212398 filed with the Japan Patent Office on Oct. 17, 2014, all the contents of which are hereby incorporated by reference.

The invention claimed is:

1. A cylinder device, comprising:
a cylinder;
a piston slidably inserted into the cylinder;
a rod inserted into the cylinder and connected to the piston;
an extension-side chamber and a compression-side chamber partitioned by the piston within the cylinder;
a tank;
an extension-side suction passage configured to permit only the passage of liquid from the tank toward the extension-side chamber;
a compression-side suction passage configured to permit only the passage of liquid from the tank toward the compression-side chamber;
a recess provided on either one of the piston and the cylinder, the recess facing the other one of the piston and the cylinder;
an extension-side discharge passage provided in the piston and configured to permit only a flow of liquid from the extension-side chamber toward the recess;
a compression-side discharge passage provided in the piston and configured to permit only a flow of liquid from the compression-side chamber toward the recess;
a tank-side discharge passage configured to allow the extension-side discharge passage and the compression-side discharge passage to communicate with the tank through the recess;
an extension-side damping force generation passage configured to apply a resistance to a flow of liquid passing therethrough so as to exert a damping force during extension; and
a compression-side damping force generation passage configured to apply a resistance to a flow of liquid passing therethrough so as to exert a damping force during contraction.

2. The cylinder device according to claim 1, wherein
the extension-side damping force generation passage is an extension-side damping passage configured to apply a resistance to a flow of liquid from the extension-side chamber toward the tank, and
the compression-side damping force generation passage is a compression-side damping passage configured to apply a resistance to a flow of liquid from the compression-side chamber toward the tank.

3. The cylinder device according to claim 1, wherein
the extension-side damping force generation passage is an extension-side communication passage configured to apply a resistance to a flow of liquid from the extension-side chamber toward the compression-side chamber, and
the compression-side damping force generation passage is a compression-side damping passage configured to apply a resistance to a flow of liquid from the compression-side chamber toward the tank.

4. The cylinder device according to claim 1, wherein
the extension-side damping force generation passage is an extension-side damping passage configured to apply a resistance to a flow of liquid from the extension-side chamber toward the tank, and
the compression-side damping force generation passage is a compression-side communication passage configured to apply a resistance to a flow of liquid from the compression-side chamber toward the extension-side chamber.

5. The cylinder device according to claim 1, wherein
the rod is inserted into the cylinder such that both ends of the rod protrude to the outside of the cylinder, and the piston is connected to the middle of the rod,
the extension-side damping force generation passage is an extension-side communication passage configured to apply a resistance to a flow of liquid from the extension-side chamber toward the compression-side chamber, and
the compression-side damping force generation passage is a compression-side communication passage configured to apply a resistance to a flow of liquid from the compression-side chamber toward the extension-side chamber.

6. The cylinder device according to claim 1, wherein
a thrust reducing stroke range in which the thrust is reduced is set by setting an axial direction width of the recess.

7. The cylinder device according to claim 1, wherein
the recess is formed as an annular groove provided on the outer periphery of the piston,
the extension-side discharge passage allows the extension-side chamber to communicate with the annular groove, and
the compression-side discharge passage allows the compression-side chamber to communicate with the annular groove.

8. The cylinder device according to claim 1, wherein
the piston comprises:

a first piston forming member provided on the rod and slidingly contacting the cylinder; and a second piston forming member provided on the rod separately from the first piston forming member and slidingly contacting the cylinder, and wherein the recess is formed as an annular gap formed between the first piston forming member and the second piston forming member, the extension-side discharge passage allows the extension-side chamber to communicate with the annular gap, and the compression-side discharge passage allows the compression-side chamber to communicate with the annular gap.

9. The cylinder device according to claim 1, wherein the recess is formed as an annular groove provided on an inner periphery of the cylinder, and the tank-side discharge passage allows the tank to communicate with the recess.

10. The cylinder device according to claim 1, comprising: an opening and closing valve provided in the tank-side discharge passage and configured to communicate and shut off between the recess and the tank.

11. The cylinder device according to claim 1, comprising: a damping force generation element provided in the tank-side discharge passage and configured to apply a resistance to a flow of liquid from within the cylinder toward the tank.

12. The cylinder device according to claim 1, comprising: a tandem pump configured to supply a liquid at an identical flow rate to both the extension-side chamber and the compression-side chamber.

* * * * *